(12) United States Patent
Botchway et al.

(10) Patent No.: US 11,329,679 B2
(45) Date of Patent: *May 10, 2022

(54) METHODS AND SYSTEMS FOR INTERFERENCE MANAGEMENT

(71) Applicant: Comcast Cable Communications Management, LLC, Philadelphia, PA (US)

(72) Inventors: Erami Botchway, New Castle, DE (US); Phillip Chang, Langhorne, PA (US); Mark Francisco, Clarksburg, NJ (US); Jim Poder, Cheltenham, PA (US); Jorge Salinger, Littleton, CO (US)

(73) Assignee: COMCAST CABLE COMMUNICATIONS MANAGEMENT, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/689,809

(22) Filed: Nov. 20, 2019

(65) Prior Publication Data

US 2020/0287580 A1 Sep. 10, 2020

Related U.S. Application Data

(63) Continuation of application No. 15/783,842, filed on Oct. 13, 2017, now Pat. No. 10,530,406, which is a
(Continued)

(51) Int. Cl.
*H04B 1/10* (2006.01)
*H04W 52/24* (2009.01)

(52) U.S. Cl.
CPC ............. *H04B 1/1027* (2013.01); *H04B 1/10* (2013.01); *H04W 52/24* (2013.01); *H05K 999/99* (2013.01)

(58) Field of Classification Search
CPC .............................. H04B 1/1027; H04W 52/24
(Continued)

(56) References Cited

U.S. PATENT DOCUMENTS 9,374,748 B2 * 6/2016 Sun ...................... H04W 16/32
9,843,347 B2 12/2017 Botchway et al.
(Continued)

OTHER PUBLICATIONS

U.S. Appl. No. 14/680,651 (U.S. Pat. No. 9,843,347), filed Apr. 7, 2015 (Dec. 12, 2017), Erami Botchway.
(Continued)

*Primary Examiner* — John J Lee
(74) *Attorney, Agent, or Firm* — Ballard Spahr LLP

(57) ABSTRACT

Methods and systems for interference management are described. Methods and systems can be used for minimizing interference among communication and/or electronic devices. Interference data can be gathered/received from interference sources such as weather and natural patterns, various electronic devices, and one or more network protocols. The interference data can be used to generate interference patterns of each interference source in an interference map. The interference map can be used to determine how a particular interference pattern can affect a system. The interference map can also be used to evaluate a new source of interference (e.g., cordless phones, weather conditions) to determine how a system can be affected. The interference data can also be associated with an interference signature (e.g., an interference pattern, a fingerprint) for an interference source in a database. The database can be used based on the interference signature to identify known and/or unknown interference sources.

27 Claims, 10 Drawing Sheets

Related U.S. Application Data continuation of application No. 14/680,651, filed on Apr. 7, 2015, now Pat. No. 9,843,347.

(58) Field of Classification Search
USPC .............. 455/63.1, 67.13, 452.1, 509, 501
See application file for complete search history.

(56) References Cited

U.S. PATENT DOCUMENTS

| | | |
|---|---|---|
| 10,530,406 B2 | 1/2020 | Botchway et al. |
| 2002/0058503 A1 | 5/2002 | Gutowski |
| 2009/0080498 A1 | 3/2009 | Deisher et al. |
| 2011/0105163 A1* | 5/2011 | Lee ...................... H04W 72/08 455/501 |
| 2012/0270536 A1* | 10/2012 | Ratasuk .............. H04W 52/146 455/423 |
| 2014/0274202 A1* | 9/2014 | Zhao .................... H04L 1/0026 455/552.1 |
| 2016/0301434 A1 | 10/2016 | Botchway et al. |
| 2018/0278279 A1 | 9/2018 | Botchway et al. |

OTHER PUBLICATIONS

U.S. Appl. No. 15/783,842 (U.S. Pat. No. 10,530,406), filed Oct. 13, 2017 (Jan. 7, 2020), Erami Botchway.

\* cited by examiner

METHODS AND SYSTEMS FOR INTERFERENCE MANAGEMENT

CROSS-REFERENCE TO RELATED APPLICATION

This application is a Continuation of U.S. Non-Provisional application Ser. No. 15/783,842 filed Oct. 13, 2017, which is a Continuation of U.S. Non-Provisional Ser. No. 14/680,651 filed Apr. 7, 2015, which issued as U.S. Pat. No. 9,843,347 on Dec. 12, 2017 herein incorporated by reference in its entirety.

BACKGROUND

Communication devices are often affected by interference. Common types of interference can comprise crosstalk or co-channel interference (CCI), inter-carrier interference (ICI) from signal modulation, electromagnetic interference (EMI) from an emission from an external source, and the like. Weather conditions can also affect the transmission of signals through air, thereby changing operating conditions of communication devices relying on those signals. Thus, there is a need for more sophisticated methods and systems for interference management. These and other shortcomings are addressed in the present disclosure.

SUMMARY

It is to be understood that both the following general description and the following detailed description are examples and explanatory only and are not restrictive. Methods and systems for interference management are disclosed. The disclosed methods and systems can be used for minimizing interference among devices in a system. Interference data can be received and/or gathered from interference sources, sensors that monitor interference sources, combinations thereof, and the like. Examples of interference sources can comprise various devices. The various devices can include communication, and/or electronic devices including both wired and wireless devices (e.g., microwave ovens, printers, computers, tablets, telephones, cordless phones, network nodes, network devices, set top boxes, televisions, radios, communication terminals, power lines, transmitters, various communication protocols used by devices, and the like). Interference sources can also comprise non-devices such as weather conditions and other natural phenomena. The interference data can be used to create and/or generate interference patterns for each interference source. The interference patterns can be mapped to an interference map, which can illustrate spatial relationships of the interference patterns, interference sources, non-interference objects (e.g., furniture, walls, and the like), combinations thereof, and the like. The interference map can be used to determine how a particular interference pattern can affect the system. The interference map can also be used to evaluate an unknown or a new source of interference (e.g., a cordless phone, a weather condition) to determine how the system might be affected. The interference map can be used as a guide to modify one or more characteristics of one or more of the interference sources to minimize interference in the system. The interference data from an interference source and the generated interference patterns can also be associated with an interference signature (e.g., a fingerprint) in a database. The interference signature can be searched to identify known and/or unknown interference sources.

In an aspect, an example method can comprise receiving interference data from a plurality of interference sources, sensors that monitor interference sources, combinations thereof, and the like. In an aspect, an interference pattern can be created and/or generated based on the interference data received. The interference pattern can comprise a spatial distribution of the interference for each of the plurality of interference sources associated with a frequency spectrum. As an example, the interference pattern can be a set of data and/or a plot of the set of data in the form of spatial coordinates of a specific location, a received signal strength indication (RSSI) value (e.g., −74 dBm, −68 dBm) of the specific location, a respective frequency (e.g., 2.4 GHZ, 750 MHZ), a respective protocol (e.g., 802.11, long term evolution (LTE)) at the spatial coordinates of the specific location (e.g., global positioning system (GPS) coordinates), combinations thereof, and the like. In an aspect, a change in the interference pattern can be determined. The change in the interference pattern can be used to infer a new interference source or a change in a known interference source of the plurality of interference sources. In an aspect, an interference source that contributes to the change in the interference pattern can be determined based on the change in the interference pattern. For example, the interference source can be determined by comparing known interference patterns of known interference sources stored in a database to the changed interference pattern. For example, each interference source can have a unique interference pattern, which can be used to create and/or generate an interference signature for each interference source. Interference source information can be included in the interference signature such as an operation frequency, a signal strength level, a location, a power level, user information, and/or the like to identify the interference source. To determine which interference source caused the change in the interference pattern, stored interference signatures can be compared to interference data gathered/received and generated interference patterns. For example, if the change in the interference pattern indicates a frequency that matches an operation frequency stored in an interference signature of a known interference source, then the interference source that caused the changed interference pattern is likely the known interference source that has the same operation frequency.

In an aspect, an example method can comprise receiving interference data from a plurality of interference sources. In an aspect, the interference data can be associated with spatial coordinates of the plurality of interference sources in a defined space (e.g., room, building, home, office, park, and the like). One or more positioning devices (e.g., a global positioning system (GPS), an accelerometer, a pressure sensor, and/or the like) installed in a computing device can determine the spatial coordinates (e.g., dimensions, an altitude) of the defined space. The computing device can also receive interference data associated with each spatial coordinate. The computing device can be configured to receive interference data such as radio interference data, microwave interference data, infrared interference data, visible light interference data, ultraviolet interference data, X-ray interference data, combinations thereof, and the like. In an aspect, the computing device can receive signals and determine the interference data from the received signals. In an aspect, an interference pattern can be created and/or generated based on the interference data and the respective spatial coordinates of the plurality of interference sources. The interference pattern can be created and/or generated by plotting the interference data at the respective spatial coordinates on an interference map. The interference map can be stored in a database. In an aspect, a change in the interference pattern can be detected. The computing device can monitor the interference pattern of a defined space and compare the monitored interference pattern to the stored interference map to determine whether the interference pattern has changed. In an aspect, an interference source of the plurality of interference sources that contributes to the change in the interference pattern can also be determined. Each interference source of the plurality of interference sources can have a unique interference pattern, which can be used to create and/or generate an interference signature for each interference source. Interference source information can be included in the interference signature. Interference source information can comprise an operation frequency, a signal strength level, a location, a power level, user information, and/or the like. To determine which interference source caused the change in the interference pattern, stored interference signatures can be compared to interference data gathered and/or received and interference patterns created and/or generated. For example, if the change in the interference pattern indicates a frequency that matches an operation frequency in an interference signature of a known interference source, then the interference source that caused the changed interference pattern is likely the known interference source that has the same operation frequency.

In an aspect, an example method can comprise determining a first performance level of an interference source of a system comprising a plurality of interference sources. The first performance level can be a level of one or more performance parameters of the interference source such as a number of errors occurring in the interference source, a speed of the interference source, and/or the like. The interference source can have a threshold performance level that is a performance level that is not acceptable for the interference source. In an aspect, an interference pattern of the system can be determined. The interference pattern of the system can be determined based on interference data received from the system. As an example, the interference pattern can comprise a spatial distribution of the plurality of interference sources associated with a frequency spectrum. In an aspect, at least one characteristic (e.g. a position, a frequency, a modulation technique, an error correction technique, a power level, a network protocol, a network channel, a power level, an operation time, and the like) of at least one of the plurality of the interference sources can be adjusted based on the determined interference pattern and the first performance level. For example, an interference source can be operating at a first performance level that is not acceptable, and therefore an adjustment (e.g., change) in one or more characteristic of at least one of the plurality of interference sources may change the first performance level of the interference source to a second performance level that is acceptable.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
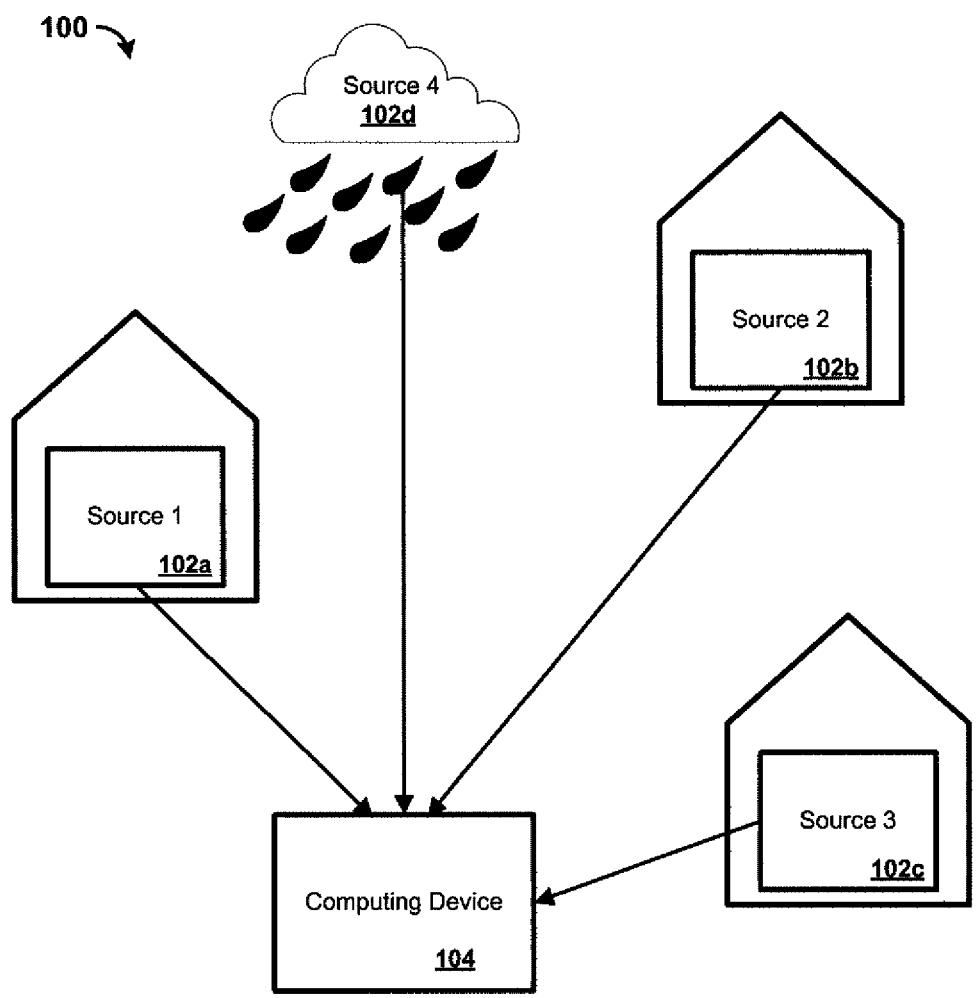
FIG. 1 illustrates various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, a special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to interference management. The disclosed methods and systems can be used for minimizing interference among devices in a system. Interference data can be received and/or gathered from interference sources, sensors that monitor interference sources, combinations thereof, and the like. Examples of interference sources can comprise various devices (e.g., communication, and/or electronic devices including both wired and wireless device) such as microwave ovens, printers, computers, tablets, telephones, cordless phones, network nodes, network devices, set top boxes, televisions, radios, communication terminals, power lines, transmitters, various communication protocols used by devices, and the like. Interference sources can also comprise non-devices such as weather conditions and other natural phenomena. The interference data can be used to create and/or generate interference patterns for each interference source. The interference patterns can be mapped on an interference map, which can illustrate spatial relationships of the interference patterns, interference sources, non-interference objects, combinations thereof, and the like. The interference map can be used to determine how a particular interference pattern can affect the system. The interference map can also be used to evaluate an unknown or a new source of interference (e.g., a cordless phone, a weather condition) to determine how the system might be affected. The interference map can be used as a guide to modify one or more characteristics of one or more of the interference sources to minimize interference in the system. The interference data from an interference source and generated interference patterns can also be associated with an interference signature (e.g., a fingerprint) in a database. The interference signature can be searched to identify known and/or unknown interference sources.

FIG. 1 illustrates various aspects of a system 100. The system 100 can comprise a computing device 104. The computing device 104 can be configured to receive (e.g., gather, collect) interference data from a plurality of interference sources 102*a*, 102*b*, 102*c*, and 102*d* that contribute to interference. The computing device can also receive sensor data from sensors that monitor interference originating from interference sources. In an aspect, the plurality of interference sources can comprise communication and/or electronic devices 102*a*, 102*b*, and 102*c*. In an aspect, the plurality of interference sources can comprise other non-device interference sources 102*d* such as a weather condition, celestial objects, and/or other natural phenomena. As an example, interference sources 102*a*, 102*b*, 102*c* can comprise one or more of microwave ovens, printers, computers, tablets, telephones, cordless phones, network nodes, network devices, set top boxes, televisions, radios, communication terminals, power lines, transmitters, and/or the like. In an aspect, communication devices and electronic devices, such as interference sources 102*a*, 102*b*, and 102*c*, can generate interference that affects performance and/or communication of other communication devices and electronic devices. Interference sources can include any device that can produce interference that impacts the device itself and/or other devices. Interference can include, but is not limited to, co-channel interference (CCI), inter-carrier interference (ICI) caused by Doppler shift in orthogonal frequency-division multiplexing (OFDM), electromagnetic interference (EMI), combinations thereof, and the like.

In an aspect, the computing device 104 can monitor the system 100 and receive data from the plurality of interference sources 102*a*, 102*b*, 102*c*, and 102*d* through wireless links (e.g., a radio frequency, a satellite) and/or physical links (e.g., a fiber optic cable, a coaxial cable, an Ethernet cable, or a combination thereof). The computing device 104 can also receive data from sensors that can measure interference. Sensors that can measure interference of an interference source, such as weather, can include a thermometer, a barometer, an anemometer, a hydrometer, a rain gauge, and the like. In an aspect, the data can comprise interference data. As an example, the interference data can comprise weather data, position data, signal strength data, modulation technique data, power level data, network protocol data, network channel data, network address data, operation time data, and/or the like. Thus, relative positions (e.g., a proximity) of the plurality of interference sources (e.g., 102*a*, 102*b*, and 102*c*) and the computing device 104 can be determined from the interference.

In an aspect, the computing device 104 can comprise a receiver (e.g., an N×M multiple-input and multiple-output (MIMO) WiFi receiver) configured to receive (e.g., gather, collect, measure) signals from an interference source 102a, 102b, 102c, and/or 102d from which the computing device 104 can determine (e.g., calculate, compute) interference data from changes in the signals. In an aspect, the receiver can have multiple receiver channels which are capable of measuring relative direction of a signal with the highest transmission energy. For example, a wideband or a full spectrum receiver in a cable modem, a satellite television, and a cable television can be configured to perform a spectral analysis to measure energy content including a signal carrier, a signal harmonic and/or a signal intermodulation. Changes in the energy content can indicate interference and can be used to determine the interference source (e.g., 102a, 102b, 102c, and 102d). For example, when the energy content is measured over time, the spectral analysis can indicate to the receiver whether an interference source (e.g., 102a, 102b, 102c, and 102d) has a frequency modulated signal or a frequency hopping signal. As an example, certain signal types such as Bluetooth (802.15.1) and Zigbee (802.15.4) use frequency hopping or spread spectrum techniques which can be readily detected. In another example, cordless and cellular technologies (such as digital enhanced cordless telecommunications (DECT) and code division multiple access (CDMA)) can have a bandwidth that is well-defined.

In an aspect, a time domain analysis of the energy content can determine a pulse-repetition-frequency (PRF) of an interference source (e.g., 102a, 102b, 102c, and 102d). Time domain analysis of the energy content to determine PRF can be used in situations where signal analysis results in more than one type of interference source causing the interference. In another aspect, time domain analysis determining the PRF of an interference source can be used in place of signal analysis. As an example where PRF is used to determine an interference source, microwave ovens transmit either a continuous wave (CW) or long cycles of a signal lasting several seconds or more. As another example, Global System for Mobile (GSM) cellular transmitters have a relatively higher PRF in comparison with microwave ovens (approximately 216 Hz with an 8 Hz component). Based on the PRF, the computing device 104 can determine whether an interference source is a microwave oven or a GSM cellular transmitter.

In an aspect, other sources of interference such as terrestrial microwave links, security fences, and aeronautical transmissions have well documented characteristics. Therefore, the receiver (such as a receiver used in a WiFi device, a television, or cellular devices) can determine spatial coordinates, a type of radio frequency interference, and a signal strength present at a specific location. In an aspect, the spectral analysis can take place over periods of days or weeks to determine whether interference sources (e.g., 102a, 102b, 102c, and 102d) are regular (e.g., a daily flight) or transient (e.g., a police car responding to an alarm).

In an aspect, an interference map can be generated for the system 100 based on the interference data of the plurality of interference sources 102a, 102b, 102c, and 102d. In an aspect, the presence and/or operation of one or more of the plurality of interference sources 102a, 102b, 102c, and 102d (e.g., a microwave oven, a printer, a computer, a tablet, a telephone, and/or the like) can be tracked according to the interference data received (e.g., gathered, collected) by the computing device 104. The interference data can be used to determine an interference pattern, which can be associated with a particular location within the system 100. The interference pattern can be a magnitude of interference received (measured, collected, gathered) at a respective locations in the system 100. The presence and/or operation of one or more of the plurality of interference sources (e.g., 102a, 102b, 102c, and 102d) can change the interference pattern by changing signal strength data, modulation technique data, power level data, and/or other types of interference data of the interference sources (e.g., 102a, 102b, 102c, and 102d).

In an aspect, to generate an interference map, the computing device 104 (e.g., a smart phone, a tablet) can define a plurality of interference sources (e.g., 102a, 102b, 102c, and 102d) and/or interference patterns within a space (e.g., a house) of the system 100. For example, a user can physically move the computing device 104 to specific locations (e.g., four corners) of the space. The computing device 104 can comprise one or more positioning devices (e.g., a global positioning system (GPS), an accelerometer, a pressure sensor, and/or the like) that can determine spatial coordinates (e.g., dimensions, altitude, and the like) of the space. At each of the spatial coordinates, the user can also measure the interference present at the spatial coordinates.

In an aspect, the computing device 104 can create and/or generate the interference map of the space with one or more interference patterns based on the interference data received. The computing device 104 can create and/or generate the interference map by aggregating and/or plotting each of the spatial coordinates determined and respective interference data. As an example, the interference pattern can comprise one or more of: a radio interference pattern, a microwave interference pattern, an infrared interference pattern, a visible light interference pattern, an ultraviolet interference pattern, an X-ray interference pattern, combinations thereof, and the like. For example, the computing device 104 can receive radio interference patterns that are in terms of radio frequency strength data (e.g., a received signal strength indication (RSSI) value) at each specific location. As such, the computing device 104 can map the interference patterns to the space in terms of radio frequency strength (e.g., an RSSI value), and/or radio frequency. As an example, the interference pattern can be a set of data and/or a plot of the set of data on the interference map in the form of an RSSI value (e.g., −74 dBm, −68 dBm) of the specific location, a respective frequency (e.g., 2.4 GHZ, 750 MHZ) and a respective protocol (e.g., 802.11, LTE) at specific spatial coordinates (e.g., GPS coordinates) on the interference map.

In an aspect, the interference map can be a two dimensional representation and/or a three dimensional representation of the interference patterns (e.g., an RSSI value and/or a radio frequency). In an aspect, the interference map can comprise a heat map where the color of the interference pattern can indicate the magnitude of the interference pattern (e.g., an RSSI value). In another aspect, the interference map can comprise an elevation map where a height and/or a depth of the interference pattern can indicate the magnitude of the interference. In an aspect, the interference map can be dynamic such that the interference patterns on the interference map are tracked over a time duration.

In an aspect, the interference map of the space within the system 100 can be stored in a database. The interference map can include the interference patterns received by the computing device 104. Each interference source 102a, 102b, 102c, and 102d and combinations thereof can have a unique interference pattern, which can be used to create and/or generate an interference signature for each interference source 102a, 102b, 102c, and 102d. Other interference source information can be included in the interference signature such as an operation frequency, a signal strength level, a location, a power level, user information, and/or the like. The interference signature can be used to detect the presence of a specific device (e.g., an interference source) within the system 100. Comparing interference patterns of stored interference signatures to newly created and/or generated interference patterns can identify an interference source that caused the change in the interference pattern. For example, if the change in the interference pattern indicates a frequency that matches an operation frequency in an interference signature of a known interference source, then the interference source that caused the changed interference pattern is likely the known interference source that has the same operation frequency.

In an aspect, one or more computing devices such as the computing device 104 can monitor the interference pattern of the system 100 by regularly receiving (e.g., gathering, collecting) the interference data and/or generating (e.g., determining, calculating) the interference data based on measurements of the system 100. The computing device 104 can determine a change in the interference pattern based on the received interference data. The computing device 104 can determine the change in the interference pattern by comparing a new generated interference pattern from the received interference data to previously generated interference patterns. The computing device can identify differences that can denote the change in the interference pattern. In another aspect, the computing device 104 can compare the generated interference patterns from the interference data at different times to corresponding times of the interference patterns that are stored in the database. For example, a change in the interference pattern can be determined every day at 9:00 AM, and the change in the interference pattern can indicate that an airplane is flying over the system 100 or that someone leaves the system 100 at that time.

Accordingly, the change in the interference pattern can indicate a new interference source has entered and/or left the system 100. In an aspect, the change in the interference pattern can be used to infer an operational status of the interference sources 102a, 102b, 102c, and 102d. An interference source of the plurality of interference sources 102a, 102b, 102c, and 102d that contributes to the change in the interference pattern can be determined based on the change. For example, the change in the interference pattern can indicate an interference pattern of an interference signature of a known interference source. The computing device 104 can compare the generated interference pattern from the received interference data to interference patterns of interference signatures stored in the database. The interference signatures can be from the interference sources 102a, 102b, 102c, and 102d. If the generated interference pattern substantially matches an interference pattern of an interference signature stored in the database, then the computing device 104 can determine that the interference source that caused the change in the interference pattern is the interference source having the matching interference signature. In an aspect, a type of the interference source can be determined from the interference signature. For example, the computing device 104 can indicate whether the interference source is an access point, a smart phone, a television, humidity in the air, and the like. As an example, a microwave oven can operate at 2450 MHz and thereby can cause interference at this frequency on a frequency spectrum. Thus, if a peak signal is detected at 2450 MHz, the computing device 104 can determine a microwave oven is in operation.

In an aspect, a network address of the interference source 102a, 102b, and 102c can be determined from the interference signature. For example, the network address can comprise an internet protocol address, a network address, a media access control (MAC) address, an Internet address, and/or the like. In another aspect, a user associated with the interference source 102a, 102b, and 102c can be determined. For example, a user can comprise an identity associated with the interference source 102a, 102b, and 102c. In another aspect, a location within the space associated with the interference source 102a, 102b, and 102c can be determined. For example, the location can comprise spatial coordinates, such as a latitude, a longitude, an altitude, a relative position with respect to a specific point (e.g., an access point), combinations thereof, and the like.

In an aspect, the computing device 104 can also determine that a new interference source that entered the system 100 is an unknown interference source based on a new interference pattern associated with the new interference source. As an example, existing interference patterns of the plurality of interference sources 102a, 102b, 102c, and 102d can comprise a frequency spectrum and a respective spatial distribution of the plurality of interference sources 102a, 102b, 102c, and 102d. The existing interference patterns can be associated with interference signatures of the interference sources 102a, 102b, 102c, and 102d. The interference signatures can be stored in the database associated with the computing device 104. In an aspect, other signature information (e.g., an operation frequency, a signal strength level, a power level, and the like) associated with the interference signatures of the interference sources 102a, 102b, 102c, and 102d can be stored in the database as part of the interference signature. The database can be searched when a change in the interference pattern is determined. The database can be searched for interference signatures that have an interference pattern matching the new interference pattern. In an aspect, when the new interference source that contributes to the change in the interference pattern cannot be identified in the database, the computing device 104 can request and/or receive necessary data associated with the unidentified interference source, and update the database accordingly. For example, the computing device 104 can determine a type of interference source of the new interference source from the new interference pattern. For example, the computing device 104 can determine that the new interference source is likely a mobile phone from similar existing interference patterns of interference signatures. The computing device 104 can try to obtain information from the new interference source through a variety of mobile communication protocols. In an aspect, an authorized user (e.g., a system administrator) can be prompted to acknowledge and/or register the new interference source added to the system 100.

In another aspect, when the new interference pattern associated with the new interference source is identified from interference patterns of the interference signatures stored in the database and the interference source is a device, then the presence of a specific user associated with the user device can be confirmed. For example, if the computing device 104 determines that there is a match of the new interference pattern to the interference pattern of the interference signature stored, then the computing device 104 can determine that a specific user (e.g., Dad) is watching TV in a living room because a smart phone associated with the specific user is detected to be within 3 feet of a set top box in the living room. The computing device 104 can detect the smart phone based on the new interference pattern and interference signature of the smart phone stored in the database. As another example, the computing device 104 can determine that a specific user device has accessed a predefined network (e.g., a home network) and/or entered a predefined area and/or associated time of access or entry.

In an aspect, when a change in an interference pattern of an interference map of the system 100 is determined, a change in at least one characteristic of one or more interference sources 102a, 102b, and 102c can be determined. As an example, the at least one characteristic can comprise one or more of a position, a frequency, a modulation technique, an error correction technique, a power level, a network protocol, a network channel, a signal transmission rate, and other characteristics of the interference sources 102a, 102b, and 102c. For example the change in at least one characteristic can occur to the interference source that causes the change in the interference pattern. As another example, the change in at least one characteristic can occur to a device (which can also be an interference source) that is affected by the interference source causing the change in the interference pattern. As another example, another interference source in the system 100 can have at least one characteristic changed to allow the device affected by the interference source to perform more optimally. As another example, changes to characteristics by any of the options above can be combined.

In an aspect, the change in the at least one characteristic can occur when a threshold performance level of a performance parameter of the device (e.g., an interference source, electronic device) affected by the new interference pattern in the system 100 is not acceptable. As an example, one or more performance parameters, such as a number of errors occurring in the device, a speed of the device, and/or the like, can be at a threshold level that is not acceptable for the device. The threshold level of a performance parameter can indicate when a change to the at least one characteristic should occur. A change in at least one characteristic can change the performance parameter from a first performance level to a second performance level. The second performance level can have the performance parameter at an acceptable threshold level.

As an example of a change in at least one characteristic, network channels can be reassigned for a plurality of access points within close proximity in a predefined area according to the determined interference source and associated characteristic. As another example characteristic change, a beacon or a trigger can be established in the plurality of interference sources (e.g., 102a, 102b, and 102c). The computing device 104 can establish a round robin schedule to enable each interference source 102a, 102b, and 102c to take turns using a spectrum. As another example, the interference source 102a, 102b, and 102c can coordinate power levels with each other via the computing device 104 to minimize interference in the system 100. As another example of a characteristic change, a first access point (AP1) can be configured to receive signals from a second access point (AP2) and a third access point (AP3). AP2 can be configured to transmit signals from the AP3 to the AP1. When interference reduces a signal transmission rate of the AP2, the AP3 can be configured to transmit signals directly to the AP1. The characteristic change where by signals are sent to the AP1 from the AP3 can be achieved by AP1 switching to the AP3 service set identifier (SSID), which is stored as a backup. In an aspect, a power level can also be coordinated. For example, an AP2 power level can be increased to overcome interference. As another example, a signal modulation can be modified to improve a signal noise ratio between the AP1 and the AP2. Multiple-input and multiple-output (MIMO) technology can also be used to create and/or generate a multiple path transmission.

In an aspect, a determined interference source and/or an associated characteristic can be uncontrollable (e.g., 102d). Examples of uncontrollable interference sources can comprise weather conditions, celestial objects, and/or other natural phenomena. When the determined interference source is an uncontrollable interference source, then the computing device 104 can change characteristics such as positions, operation frequencies, operation channels, modulation techniques, error correction techniques, power levels, and the like of a controllable interference source (e.g., 102a, 102b, and 102c).

Figure 2:
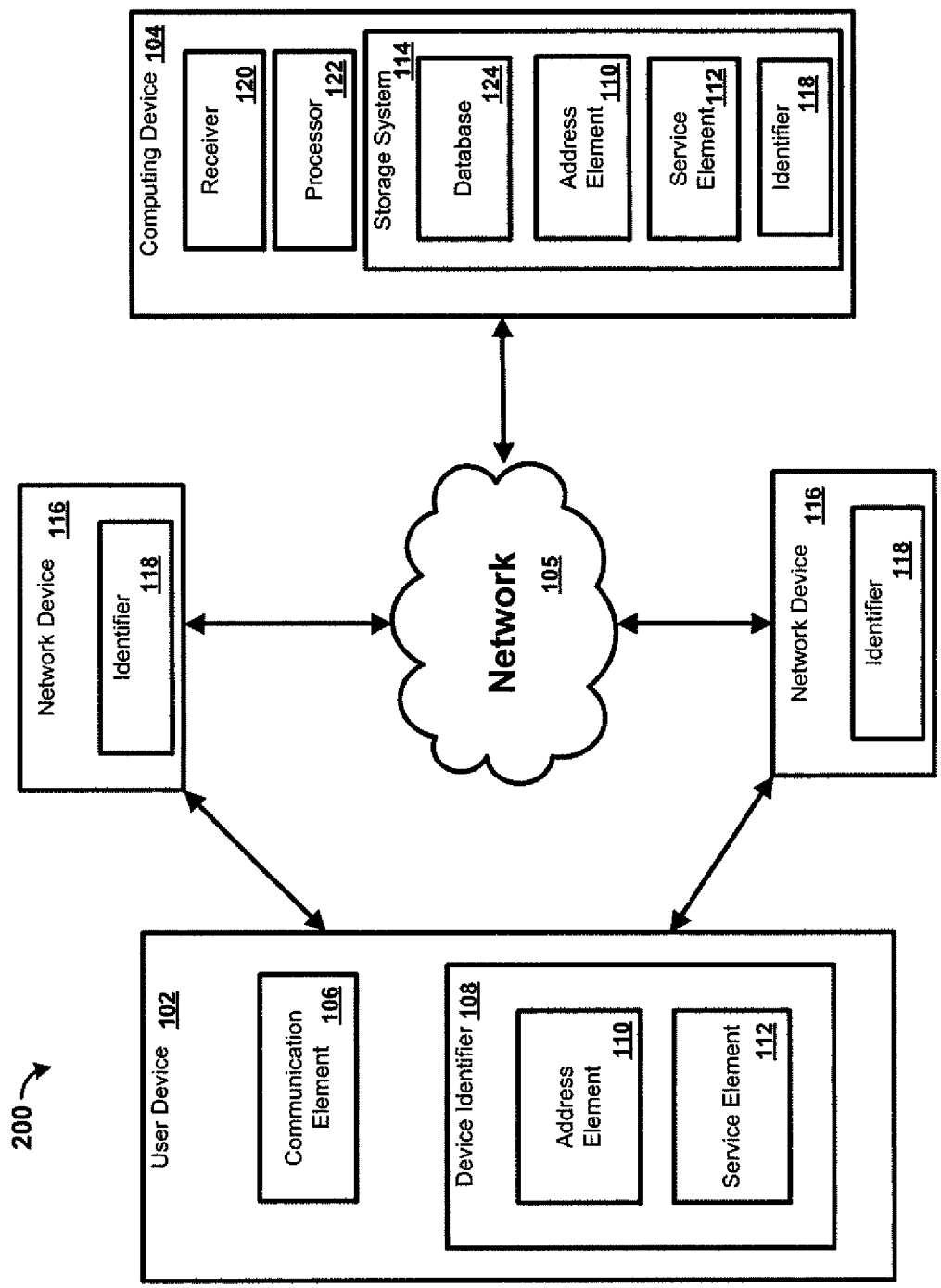
FIG. 2 illustrates various aspects of an exemplary system.

FIG. 2 illustrates various aspects of an exemplary system 200. In one aspect of the disclosure, the system 200 can be configured to offer services (such as network-related services) to a user device. The system 200 can comprise a user device 102 (e.g., interference sources 102a, 102b, and 102c) in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels.

In an aspect, the user device 102 can be an electronic device such as a computer, a smartphone, a laptop, a tablet, a set top box, a display device, a printer, a microwave, a printer, a computer, a tablet, a telephone, a cordless phone, a network node, a network device, a communication terminal, a transmitter, other device capable of communicating with the computing device 104. As an example, the user device 102 can comprise a communication element 106 for offering an interface to a user to interact with the user device 102 and/or the computing device 104. The communication element 106 can be any interface for presenting and/or receiving information to/from the user, such as user feedback. An example interface may be a communication interface such as a web browser (e.g., Internet Explorer®, Mozilla Firefox®, Google Chrome®, Safari®, or the like). Other software, hardware, and/or interfaces can be used to facilitate communication between the user and one or more of the user device 102 and the computing device 104. As an example, the communication element 106 can request or query various files from a local source and/or a remote source. As a further example, the communication element 106 can transmit data to a local or remote device such as the computing device 104, In an aspect, the user device 102 can be associated with a user identifier or device identifier 108. As an example, the device identifier 108 can be any identifier, token, character, string, or the like, for differentiating one user or user device (e.g., a user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or make available an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. The class of the user device 102 can be related to a type of device, a capability of a device, a type of service being offered, and/or a level of service (e.g., a business class, a service tier, a service package, etc.). As an example, the service element 112 can comprise information relating to or made available by a communication service provider (e.g., an Internet service provider) that is offering or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vise versa. As a further example, one or more of the address element 110 and the service element 112 can be stored remotely from the user device 102 and retrieved by one or more devices such as the user device 102 and the computing device 104. Other information can be represented by the service element 112.

In an aspect, one or more network devices 116 can be in communication with a network such as network 105. As an example, one or more of the network devices 116 can facilitate the connection of a device, such as the user device 102, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth or any desired method or standard.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or a private network) to function as a local network for a particular user or users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise an identifier 118 that is distinct. As an example, the identifiers 118 can be associated with a physical location of the network devices 116.

In an aspect, the computing device 104 can be a server for communicating with the user device 102. As an example, the computing device 104 can communicate with the user device 102 for offering data and/or services. As an example, the computing device 104 can offer services such as network (e.g., Internet) connectivity, network printing, media management (e.g., a media server), interference management, content services, streaming services, broadband services, or other network-related services. In an aspect, the computing device 104 can allow the user device 102 to interact with remote resources such as data, devices, and files. As an example, the computing device 104 can be configured as (or disposed at) a central location (e.g., a headend, or a processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a storage system 114 for sending and receiving data therebetween. As an example, the storage system 114 can store a plurality of files, user identifiers or records, or other information. As a further example, the user device 102 can request and/or retrieve a file from the storage system 114. In an aspect, the storage system 114 can store information relating to the user device 102 such as the address element 110 and/or the service element 112. As an example, the computing device 104 can obtain the device identifier 108 from the user device 102 and retrieve information from the storage system 114 such as the address element 110 and/or the service elements 112. As a further example, the computing device 104 can obtain the address element 110 from the user device 102 and can retrieve the service element 112 from the storage system 114, or vice versa. In an aspect, the storage system 114 can comprise a database 124 configured for storing interference data received from the plurality of interference sources (e.g., user device 102), storing interference patterns based on the interference data, storing interference signatures, and/or storing interference maps. For example, the computing device 104 can search the database 124 to determine whether an interference source is known or an unknown to the system 200 by comparing received interference data with stored interference data. When the interference source is known to the system 200, the computing device 104 can determine data (e.g., a user, a location, a network address, and/or the like) associated with the known interference source from the database 124. When the interference source is unknown to the system 200, the computing device 104 can receive (e.g., acquire, collect, etc.) necessary data associated with the unknown interference source and update the database 124. Any information can be stored in and retrieved from the storage system 114. The storage system 114 can be disposed remotely from the computing device 104 and accessed via direct or indirect connection. The storage system 114 can be integrated with the computing device 104 or some other device or system.

In an aspect, the computing device 104 can comprise a receiver 120. The receiver 120 can be configured to receive interference data from one or more user devices 102, network devices 116, or other sensors that can monitor and gather data from interference sources. For example sensors can include a thermometer, a barometer, an anemometer, a hydrometer, a rain gauge, and the like. As an example, the interference data can comprise weather data, position data, signal strength data, modulation technique data, power level data, network protocol data, network channel data, network address data, and the like. The receiver 120 can receive interference data through wireless links (e.g., a radio frequency, a satellite) and/or physical links (e.g., a fiber optic cable, a coaxial cable, an Ethernet cable, or a combination thereof).

In an aspect, the computing device 104 can comprise a processor 122. The processor 122 can determine (e.g., calculate, create, generate) a pattern (e.g., an interference pattern) based on the interference data received by the receiver 120. In an aspect, the interference pattern can comprise a frequency spectrum associated with a plurality of user devices (e.g., the user device 102). The frequency spectrum can comprise a radio frequency spectrum, a microwave frequency spectrum, an infrared frequency spectrum, a visible light frequency spectrum, an ultraviolet frequency spectrum, an X-ray frequency spectrum, combinations thereof, and the like. In another aspect, the interference pattern can comprise location information (e.g., spatial coordinates) of a plurality of user devices (e.g., the user device 102). The interference pattern can be stored in the database 124. In an aspect the interference pattern can be associated with an interference signature of an interference source. An interference signature can comprise the interference pattern, an operation frequency, a signal strength level, a location, a power level, user information, and/or the like to identify the interference source. In an aspect, the interference pattern can be plotted on an interference map.

In an aspect, the processor 122 can determine a change in the interference pattern. For example, the change in the interference pattern can comprise a change in amplitude of a specific frequency or a frequency spectrum. The change in the interference pattern can indicate a type of interference source that is contributing to the change in the interference pattern, such as a specific type of device, a specific weather condition, and the like. For example, a microwave oven operates at 2450 MHz and thereby causes interference at this frequency. Thus, if a peak signal is detected at 2450 MHz, the computing device 104 can determine a microwave oven is in operation. The computing device 104 can compare the changed interference pattern that has the 2450 MHz signal to interference patterns stored in a database 124 or interference patterns associated with an interference signature stored in the database 124. As another example, the processor 122 can also determine whether the interference source that contributes to the change in the interference pattern is known or unknown to the system 200. If the changed interference pattern does not exist in the database 124 the computing device 104 can determine that the interference source causing the change is unknown.

In an aspect, the processor 122 can determine a change in at least one characteristic of one or more interference sources based on the interference source determined to cause the change in the interference pattern. The change in at least one characteristic can occur to a user device 102 that is affected by the interference source that caused the change in the interference pattern. In an aspect, the change in at least one characteristic can occur to a network device 116 which may or may not be affected by the change in the interference pattern. In another aspect, the change in at least one characteristic can occur to the interference source that caused the change in the interference pattern. In another aspect, the change in at least one characteristic can occur to another interference source. As an example, the at least one characteristic can comprise one or more of a position, a frequency, a modulation technique, an error correction technique, a power level, a network protocol, a network channel, a combination thereof, and the like.

In an aspect, the computing device 104 can transmit a signal (e.g., command, instruction) to the user device 102, the network device 116, other interference source, combinations thereof, and the like, (e.g., for example utilizing an Application Programming Interface (API)) that causes the user device 102, the network device 116, other interference source, combinations thereof, and the like to change the at least one characteristic. The computing device 104 can transmit the signal via the network 105.

Figure 3A:
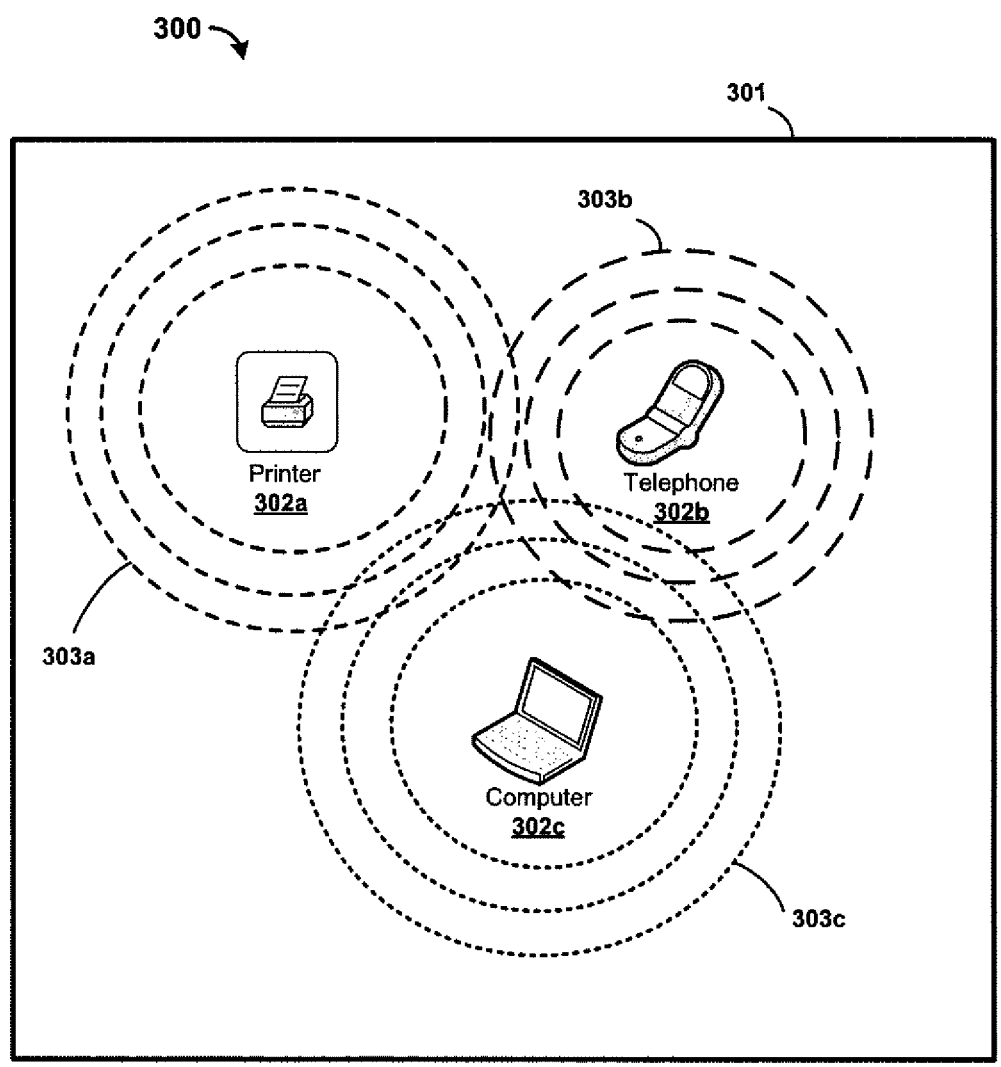
FIG. 3A illustrates various aspects of an exemplary system.

FIG. 3A illustrates various aspects of an interference map 301 a system 300. The system 300 can comprise a plurality of user devices, such as a printer 302a, a telephone 302b, and a computer 302c. Each user device 302a, 302b, 302c can be a source of interference for the system 300. The user devices 302a, 302b, 302c can be examples of interference sources 102a, 102b, and 102c of FIG. 1. In an aspect, the interference map 301 illustrates interference patterns (e.g., electromagnetic waves 303a, 303b, and 303c) originating from the respective user devices 302a, 302b, and 302c. In an aspect, the electromagnetic waves 303a, 303b, and 303c can comprise the same or similar frequency, thereby causing interference for the system 300. For example, when two or more propagating waves (e.g., 303a, 303b, and 303c) are incident on the same point, the total displacement at that point can be equal to the vector sum of the displacements of the individual waves. As such, the system 300 can exhibit poor frequency spectrum use, resulting in a low quality user experience. For example, if a user device is added to the system 300 in an area where two or more electromagnetic waves 303a, 303b, and 303c overlap, then the user device can experience interference when trying to receive a signal from one or more of the user devices 302a, 302b, and 302c. Similarly, a new user device added to the system 300, when operated, can produce interference that can negatively impact the performance of one or more of the user devices 302a, 302b, and 302c if the added user device's interference pattern is in the vicinity of one or more of the user devices 302a, 302b, and 302c.

Figure 3B:
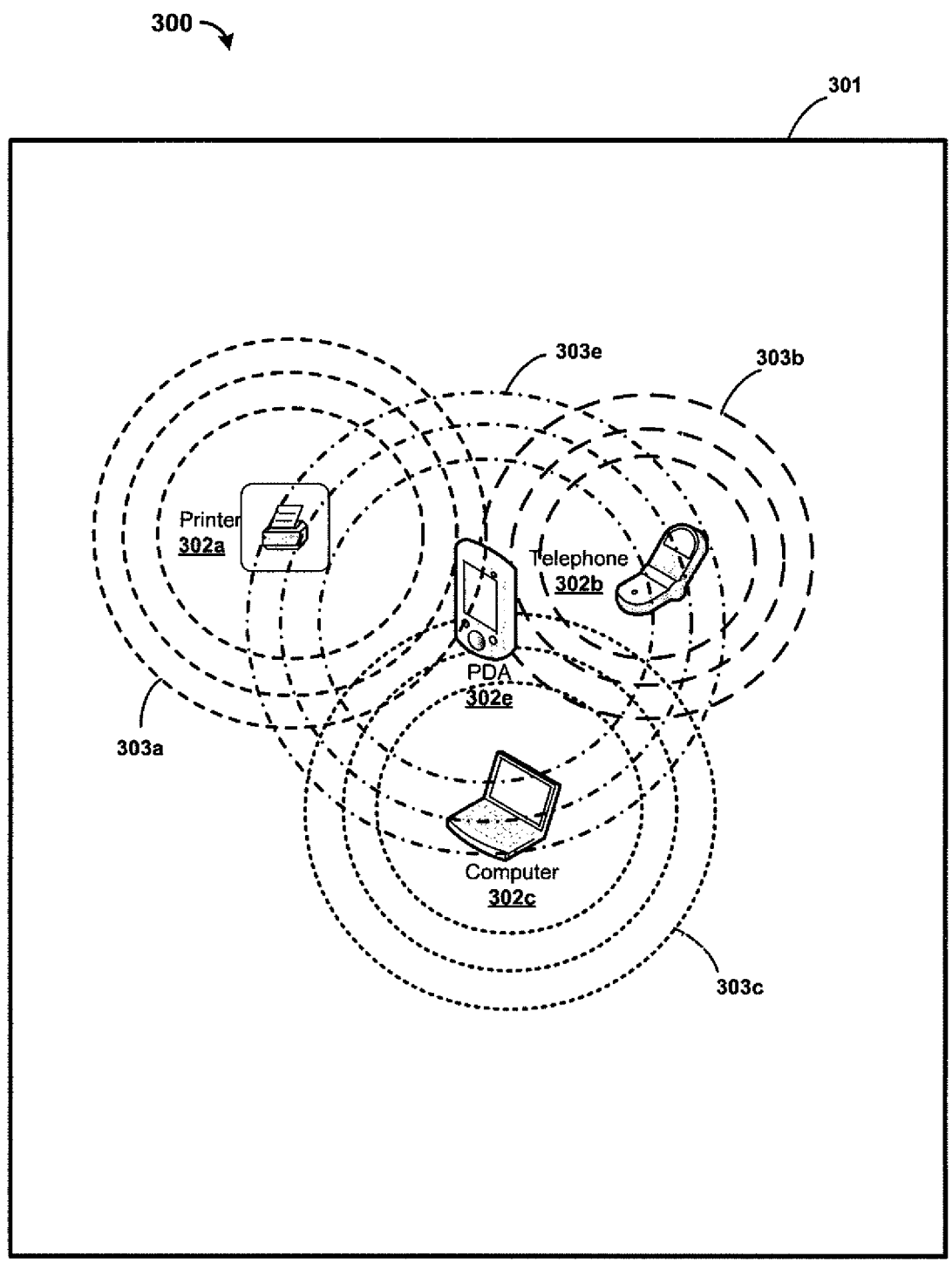
FIG. 3B illustrates various aspects of an exemplary system.

FIG. 3B illustrates various aspects of the system 300 when a user device 302e is introduced to the system 300. As illustrated on the interference map 301 a user device (e.g., a PDA) 302e has entered the system 300. The user device 302e can generate an electromagnetic wave (e.g., an interference pattern) 303e. In an aspect, the electromagnetic waves 303a, 303b, and 303c can comprise the same or similar frequency as the electromagnetic wave 303e. In an aspect, the user device 302e can be in the range of the electromagnetic waves 303a, 303b, and 303c. Likewise, the electromagnetic wave 303e can be in range of the user devices 302a, 302b, and 302c. As an example, if the user device 302e tries to communicate with user device 302c, then the communication can experience interference from one or more of the electromagnetic waves 303a and 303b. Furthermore, the electromagnetic wave 303e can interfere with the performance and/or communication of the user devices 302a, 302b, and 302c.

In an aspect, the interference map 301 can be monitored by a computing device such as the computing device 104 of FIG. 1 and/or one or more of the user devices 302a, 302b, and 302c. A change in the interference patterns of the interference map 301 can indicate the presence of a specific device and/or a specific user. For example, when user device 302e enters the system 300, then user device 302e can be detected due to a change in the interference map 301. In an aspect, the user device 302e can be automatically identified based on the interference pattern of the user device 302e. The computing device 104 can compare the interference pattern to interference patterns associated with interference signatures stored in a database (e.g., the database 124). If there is a matching interference pattern, then particular signature information and/or information about the user device 302e can be obtained from the interference signature. In an aspect, an authorized user (e.g., a system administrator) can be prompted to acknowledge and/or register the user device added (e.g., user device 302e) and/or user when the user device 302e is unknown. In another aspect, the user of the user device 302e can be denied registering the user device 302e and/or user to the system 300. In an aspect, a security system can be notified (e.g., signaled) that an unauthorized user device/user is present in the system 300.

Figure 4:
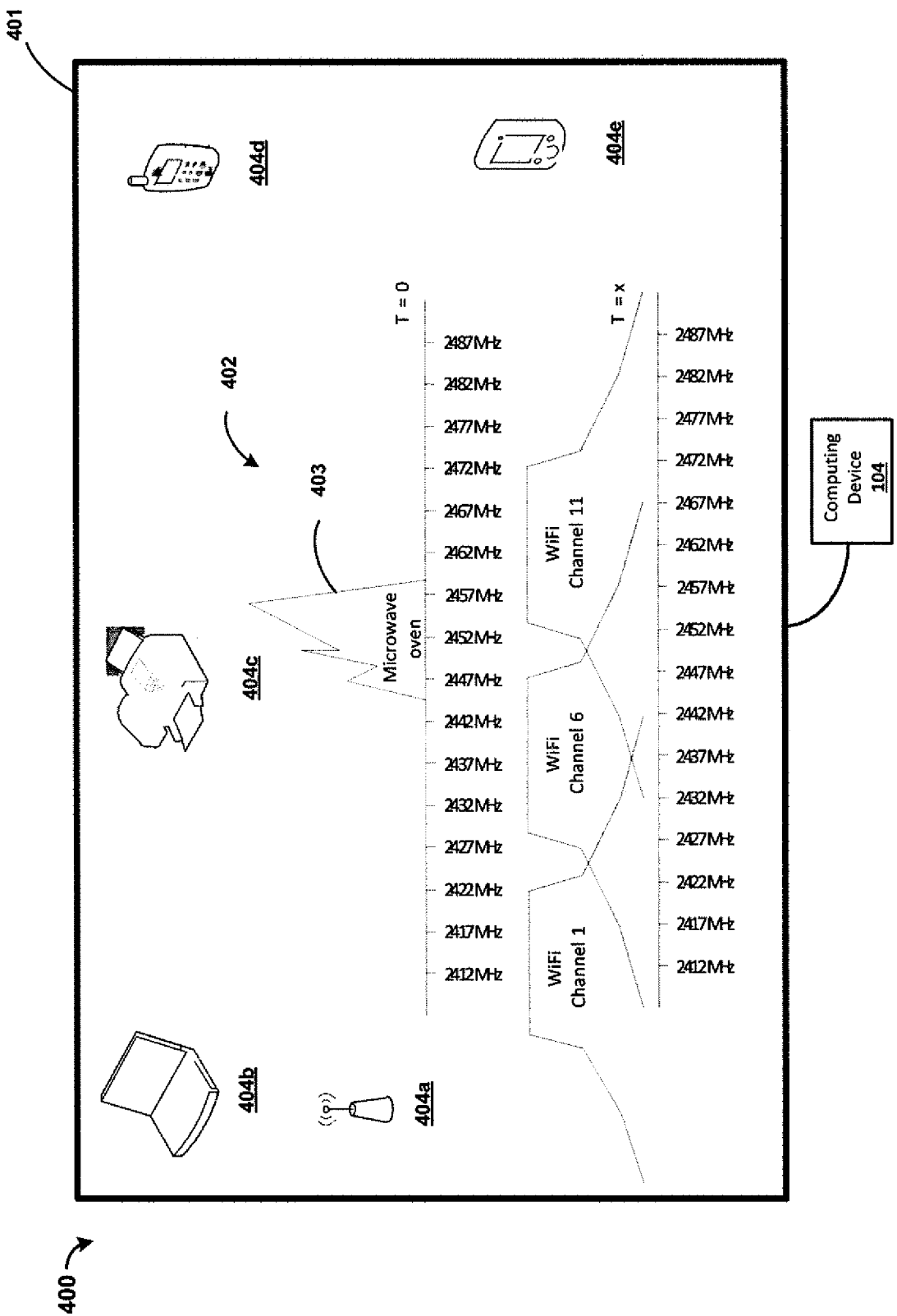
FIG. 4 illustrates various aspects of an exemplary system.

FIG. 4 illustrates an interference map 401 of one or more interference patterns 402 associated with a system 400. In an aspect, the interference patterns 402 can comprise a frequency spectrum 403 associated with a plurality of interference sources such as user devices 404a, 404b, 404c, 404d, and 404e that operate at or produce one or more the frequencies on the frequency spectrum 403. The frequency spectrum 403 can comprise one or more of: a radio frequency spectrum, a microwave frequency spectrum, an infrared frequency spectrum, a visible light frequency spectrum, an ultraviolet frequency spectrum, an X-ray frequency spectrum, combinations thereof, and the like. In another aspect, the interference map 401 can comprise a spatial distribution of the user devices 404a, 404b, 404c, 404d, and 404e associated with the frequency spectrum 403. The spatial distribution can be the location (e.g., spatial coordinates) of each user device 404a, 404b, 404c, 404d, and 404e in relation to each other. The interference pattern 402 can be stored in a database (e.g., the database 124) of a computing device such as the computing device 104. In an aspect, once an interference map 401 is generated, an interference is detected within the system 400, and the computing device 104 determines that the interference causes a user device to perform below a performance level, then the computing device 104 can change a characteristic of one or more of the user devices 404a, 404b, 404c, 404d, and 404e and/or device causing adjustment of the interference within the system 400 to improve performance of one or more of the user devices 404a, 404b, 404c, 404d, and 404e in the presence of the interference.

As an example, a microwave oven can be operating and producing electromagnetic waves having a frequency bandwidth of around 2444 MHz to 2460 MHz. Other interference sources (e.g., user devices 404a, 404b, 404c, 404d, and 404e) can be using one or more WiFi channels such as channel 1, channel 6, and channel 11. Channel 1 can operate at 2412 MHz, channel 6 can operate at 2437 MHz and channel 11 can operate at 2462 MHz. Each channel can have a channel width of 22 MHz (e.g., channel 1: 2401-2423 MHz, channel 6: 2426-2448 MHz, and channel 11: 2451-2473 MHz). Therefore, when the microwave oven is operating, the microwave oven can produce electromagnetic waves that can interfere with the user devices 404a, 404b, 404c, 404d, and 404e using channel 6 and channel 11. In an aspect, the computing device 104 can determine that the user devices 404a, 404b, 404c, 404d, and 404e using these channels can be affected by the interference of the microwave oven. In an aspect, the computing device 104 can change and/or suggest a change in one or more characteristics of the user devices 404a, 404b, 404c, 404d, and 404e operating with channel 6 and channel 11. For example, the computing device 104 can switch the user devices 404a, 404b, 404c, 404d, and 404e from using channel 6 and/or channel 11 to using channel 1 since the frequency width of channel 1 does not share any common frequencies with that of the interference pattern of the microwave oven. In another example, the computing device 104 can suggest locations in the system 400 where a system manager can relocate and/or move one or more of the user devices 404a, 404b, 404c, 404d, and 404e using channel 6 and/or channel 11. The computing device can suggest locations for the one or more user devices 404a, 404b, 404c, 404d, and 404e in the system 100 that minimize or eliminate the interference of the microwave. In another aspect, the computing device 104 can recommend moving the microwave oven and/or other interference sources to minimize or eliminate interference to user devices 404a, 404b, 404c, 404d, and 404e using channel 6 and/or channel 11.

Figure 5:
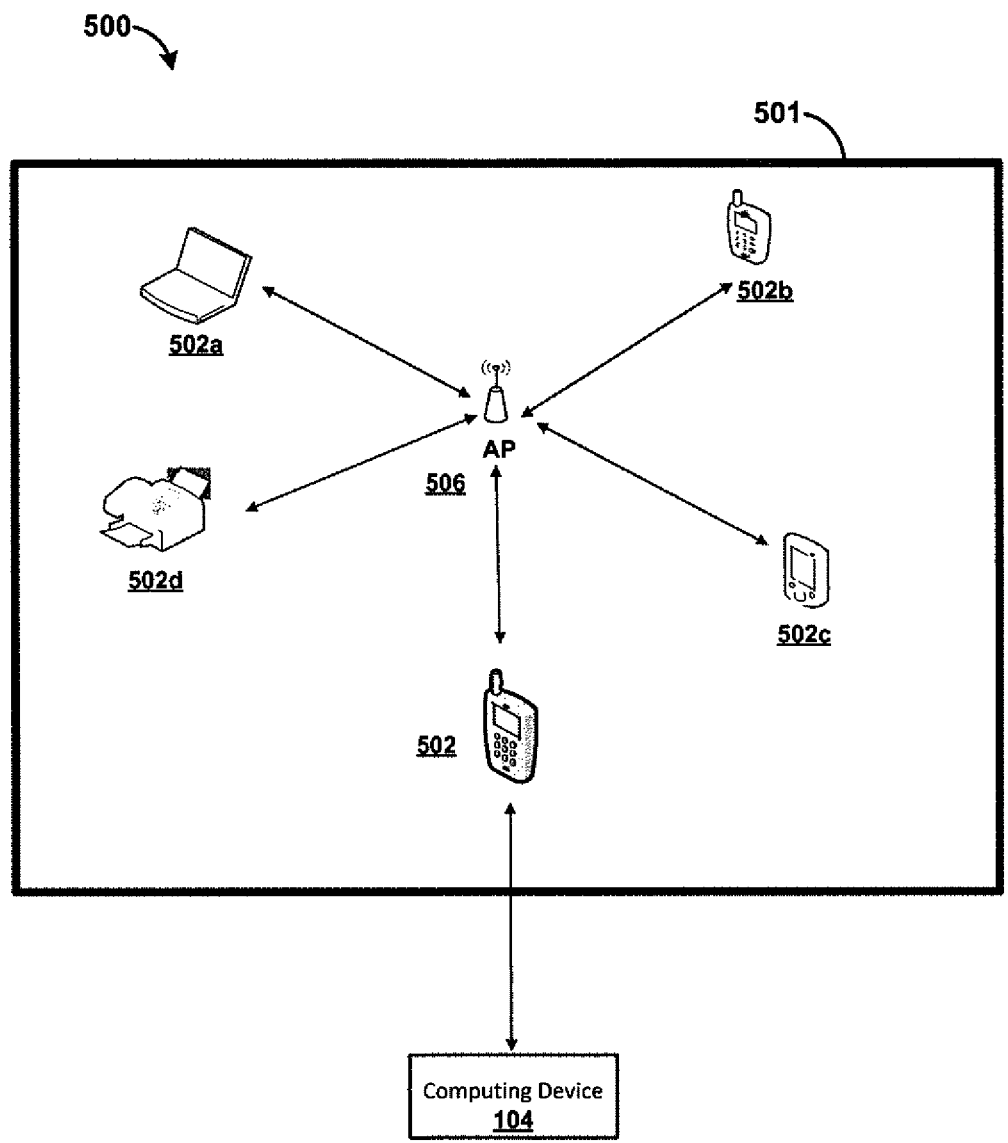
FIG. 5 illustrates various aspects of an exemplary system.

FIG. 5 illustrates various aspects of a system 500. In an aspect, interference data in a predefined area 501 can be measured (e.g., monitored, calculated, determined) with a mobile user device 502. The mobile user device 502 can create and/or generate an interference pattern based on the interference data or can send the interference data to a computing device 104 to create and/or generate an interference pattern. Furthermore, an interference map incorporating the interference pattern, the predefined area 501, a plurality of user devices 502a, 502b, 502c, and 502d, and/or other interference sources can be created and/or generated by the mobile user device 502 and/or the computing device 104. For example, the mobile user device 502, such as a smartphone, can be registered with a wireless access point (AP) 506, wherein the AP 506 can be placed at a desired location within a predefined area 501. A user can move through the predefined area 501 (e.g., a house) holding the mobile user device 502 (e.g., a smart phone) to measure interference and determine interference data. For example, the user can select one or more locations in the predefined area 501 with minimal 802.11 signal strength and strongest 802.11 signal strength from one or more preselected service set identifiers (SSIDs). In an aspect, interference data can comprise signal strengths and location information of the plurality of user devices 502a, 502b, 502c, and 502d in the predefined area 501.

In an aspect, time domain data can be used to differentiate signals, for example, duration of signals can be used to determine types of signals. In an aspect, frequency domain data and channel width can be used to differentiate signals. For example, the mobile user device 502 can receive signal strength and location information of the user devices 502a, 502b, 502c and 502d. In an aspect, the location information can be spatial coordinates, such as a latitude, a longitude, an altitude, position information with respect to a specific position (e.g., the AP 506), combinations thereof, and the like. In another aspect, the location information can be associated with an RSSI value detected by the mobile user device 502. The location information can be used to determine the relative position (e.g., a proximity) of one user device (e.g., 502a) to another user device (e.g., 502d). In another aspect, interference data can comprise spatial coordinates of the predefined area 501. For example, the user can move to a border of the predefined area 501 to establish spatial coordinates of the predefined area 501. In an aspect, the mobile user device 502 can collect location information based on observed time difference of arrival (OTDOA) methods utilizing LTE signals of the mobile user device 502. In an aspect, the interference data (e.g., a signal strength, location information) received by the mobile user device 502 (e.g., a smart phone) can be transmitted to the computing device 104 which can generate an interference map and perform other methods described herein.

In an aspect, calibrations of the interference patterns can be performed to take into account factors that can change the interference, such as attenuation. In an aspect, the AP 506 can transmit a strong continuous wave (CW) carrier for calibration of the interference patterns with respect to attenuation in the predefined area 501. For example, the AP 506 can transmit a CW signal of a certain magnitude. The certainty of magnitude in relation to attenuation can be higher for the CW signal in comparison to a signal burst. The certainty of the magnitude can indicate accurate attenuation information for the predefined area 501. The CW signal can be transmitted at a different frequency than the 802.11 channel to minimize interference. The mobile user device 502 can be positioned at different locations in the predefined area 501 to measure the CW signal produced by the AP 506 and determine the attenuation of the CW signal. In an aspect, calibration can be achieved using two APs as reference points. Anywhere besides the two APs can be treated as data points for possible placement of the two APs to so that the APs can deliver better coverage to the predefined area 501 with respect to attenuation and interference.

Figure 6:
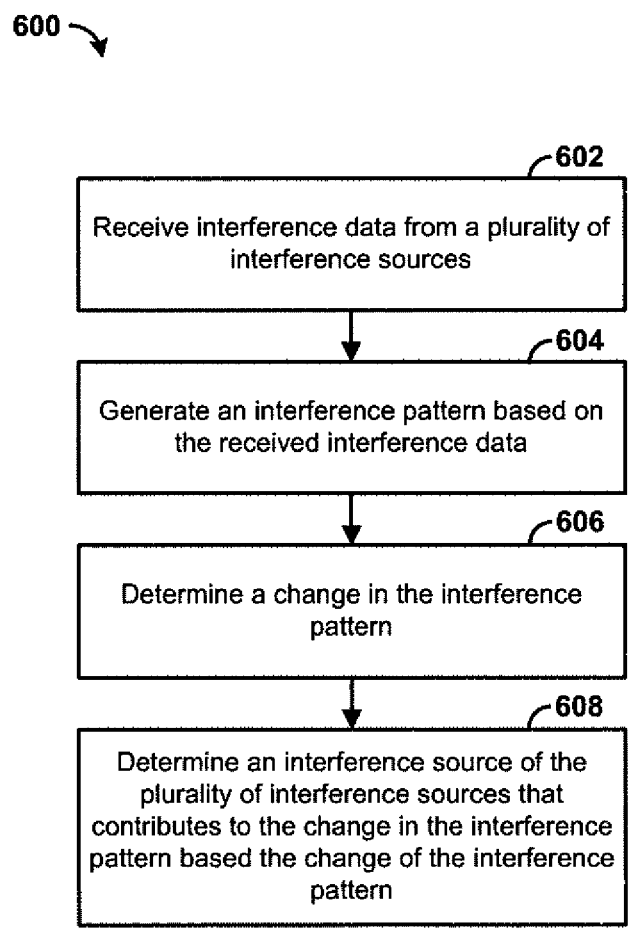
FIG. 6 is a flowchart illustrating an example method.

FIG. 6 is a flowchart illustrating an example method 600. At step 602, interference data from a plurality of interference sources can be received. In an aspect, a computing device (e.g., the computing device 104) can receive the interference data from a plurality of interference sources (e.g., 102*a*, 102*b*, and 102*c*) and/or sensors that monitor (e.g., measure, quantify) interference sources (e.g., 102*d*). As an example, the plurality of interference sources can comprise microwave ovens, printers, computers, tablets, telephones, cordless phones, network nodes, network devices, set top boxes, televisions, radios, communication terminals, power lines, transmitters, atmosphere, and/or the like. As an example, the interference data can comprise weather data (e.g., a temperature, an air pressure, a wind speed, and a moisture level), position data, signal strength data, modulation technique data, power level data, network protocol data, network channel data, network address data, and/or the like. In an aspect, the computing device 104 can receive interference data from the plurality of interference sources via wireless links (e.g., a radio frequency, a satellite) and/or physical links (e.g., a fiber optic cable, a coaxial cable, an Ethernet cable, or a combination thereof). The interference data received can be stored at a database (e.g., the database 124) of the computing device 104. Sensors that can measure interference of an interference source, such as weather, can include a thermometer, a barometer, an anemometer, a hydrometer, a rain gauge, and the like.

In an aspect, the computing device 104 can comprise a receiver (e.g., an N×M multiple-input and multiple-output (MIMO) WiFi receiver) configured to receive (e.g., gather, collect, measure) signals from an interference source 102*a*, 102*b*, 102*c*, and/or 102*d* from which the computing device 104 can determine (e.g., calculate, compute) interference data from changes in the signals. In an aspect, the receiver can have multiple receiver channels which are capable of measuring relative direction of a signal with the highest transmission energy. For example, a wideband or a full spectrum receiver in a cable modem, a satellite television, and a cable television can be configured to perform a spectral analysis to measure energy content including a signal carrier, a signal harmonic and/or a signal intermodulation. Changes in the energy content can indicate interference and can be used to determine the interference source (e.g., 102*a*, 102*b*, 102*c*, and 102*d*). For example, when the energy content is measured over time, the spectral analysis can indicate to the receiver whether an interference source (e.g., 102*a*, 102*b*, 102*c*, and 102*d*) is a frequency modulated signal or a frequency hopping signal. As an example, certain signal types such as Bluetooth (802.15.1) and Zigbee (802.15.4) use frequency hopping or spread spectrum techniques which can be readily detected. In another example, cordless and cellular technologies such as digital enhanced cordless telecommunications (DECT) and code division multiple access (CDMA) can have a bandwidth that is well-defined.

In an aspect, a time domain analysis of the energy content can determine a pulse-repetition-frequency (PRF) of an interference source (e.g., 102*a*, 102*b*, 102*c*, and 102*d*). Time domain analysis of the energy content to determine PRF can be used in situations when signal analysis results in more than one type of interference source. In an aspect, time domain analysis determining the PRF of an interference source can be used in place of signal analysis. As an example of using PRF to determine an interference source, microwave ovens transmit either a continuous wave (CW) or long cycles of a signal lasting several seconds or more. As another example, global system for mobile (GSM) cellular transmitters have a relatively higher PRF in comparison with microwave ovens (approximately 216 Hz with an 8 Hz component). Based on the PRF, the computing device 104 can determine whether an interference source is a microwave or a GSM cellular transmitter.

In an aspect, other sources of interference such as terrestrial microwave links, security fences, and aeronautical transmissions have well documented characteristics. Therefore, the receiver (such as a receiver used in a WiFi device, a television, or cellular devices) can determine spatial coordinates, a type of radio frequency interference, and a signal strength present at a specific location. In an aspect, the spectral analysis can take place over periods of days or weeks to determine whether interference sources (e.g., 102*a*, 102*b*, 102*c*, and 102*d*) are regular (e.g., a daily flight) or transient (e.g., a police car responding to an alarm).

At step 604, an interference pattern based on the interference data received can be created and/or generated. As an example, the interference pattern can comprise one or more of: a radio interference pattern, a microwave interference pattern, an infrared interference pattern, a visible light interference pattern, an ultraviolet interference pattern, an X-ray interference pattern, combinations thereof, and the like. In an aspect, the interference pattern can comprise a frequency spectrum associated with the plurality of interference sources. In another aspect, the interference pattern can comprise a spatial distribution of the plurality of interference sources associated with the frequency spectrum. As an example, the interference pattern can be a set of data and/or a plot of the set of data in the form of spatial coordinates of a specific location, an RSSI value (e.g., −74 dBm, −68 dBm) of the specific location, a respective frequency (e.g., 2.4 GHZ, 750 MHZ) and a respective protocol (e.g., 802.11, LTE) at the spatial coordinates of the specific location (e.g., GPS coordinates). The interference pattern can be stored in a database (e.g., the database 124) of the computing device 104.

At step 606, a change in the interference pattern can be determined. In an aspect, a change in the interference pattern can be determined when a signal strength change at certain frequency and/or a frequency magnitude change are detected. For example, the signal strength change can indicate an interference source (e.g., a user device) changes from an inoperative state to an operative state, or vice versa. In another aspect, a change in the interference pattern can be determined when a change in the spatial distribution of the plurality of interference sources is detected.

At step 608, an interference source of the plurality of interference sources that contributes to the change in the interference pattern can be determined. In an aspect, a type of the interference source can be determined based on the interference pattern and the change in the interference pattern. For example, a change in spatial distribution can indicate an interference source (e.g., a user device) moved from one location to another location. Thus, the computing device 104 can infer the type of interference source. For example, if the interference pattern indicates a change in location of an interference source, then the type of interference source can be a mobile device. In an aspect, analyzing the interference pattern over time can also indicate a repetitive nature of interference sources, which can further be used to determine the type of interference. For example, an interference change detected daily at a consistent time and that generates a consistent interference pattern could indicate a daily flight of an airplane. In another example, a microwave oven operates at 2450 MHz and thereby can cause interference at this frequency. When a signal strength increase is detected at 2450 MHz, the computing device 104 can determine a microwave oven is in operation, for example, via a search of a database (e.g., the database 124). In another aspect, the computing device 104 can determine the interference source that contributes to the change in the interference pattern is an unknown source, via the search of the database (e.g., the database 124), for example. In an aspect, when the interference source that contributes to the change in the interference pattern is unknown to the system, the computing device 104 can receive necessary device information associated with the unknown source of interference, and update the database (e.g., the database 124) accordingly. The computing device 104 can determine whether or not an interference source is known or unknown by comparing a new interference pattern to interference patterns associated with interference signatures stored in the database 124. If the new interference pattern matches an interference pattern of an interference signature, then the new interference pattern is likely caused by the interference source associated with the interference signature. In an aspect, the computing device 104 can determine the interference source is an unauthorized interference source. In an aspect, the computing device 104 can signal a security system of a presence of the interference source when the interference source is an unauthorized interference source. The security system can alert authorities to an intruder in the system.

When the interference source that contributes to the change in the interference pattern is determined, the computing device 104 can further determine device information associated with the interference source. The device information can be determined from the interference source or retrieved from the interference signature stored in the database 124. For example, a network address of the interference source can be determined. As another example, a user associated with the interference source can be determined. As another example, a location associated with the interference source can be determined. In an aspect, signature information (e.g., an interference pattern, an operation frequency, a signal strength level, a power level, a combination thereof, and the like) of each interference source can be associated with the interference signature and stored in the database (e.g., the database 124). In an aspect, the signature information can be used to confirm that a specific user is present. For example, the computing device 104 can determine that the specific user (e.g., a dad, a mom) is watching TV in a living room based on the signature information of the smart phone associated with the specific user because the interference pattern indicates that the specific user is within 3 feet of a set top box in the living room.

In an aspect, a change in at least one characteristic of one or more interference source can be determined to mitigate interference associated with the interference source. The change in at least one characteristic can be based on the interference source that contributes to the change in the interference pattern. As an example, the at least one characteristic can comprise one or more of a position, a frequency, a modulation technique, an error correction technique, a power level, a network protocol, a network channel, an operation time, and the like. As an example of a change in at least one characteristic, network channels can be reassigned for a plurality of access points within close proximity in a predefined area according to the determined interference source and associated characteristic. As another example characteristic change, a beacon or a trigger can be established in the plurality of interference sources (e.g., 102a, 102b, and 102c). The computing device 104 can establish a round robin schedule to enable each interference source 102a, 102b, and 102c to take turns using a spectrum. As another example, the interference source 102a, 102b, and 102c can coordinate power levels with each other via the computing device 104 to minimize interference in the system 100.

As another example of a characteristic change, a first access point (AP1) can be configured to receive signals from a second access point (AP2) and a third access point (AP3). AP2 can be configured to transmit signals from the AP3 to the AP1. When interference reduces a signal transmission rate of the AP2, the AP3 can be configured to transmit signals directly to the AP1. The characteristic change where by signals are sent to the AP1 from the AP3 can be achieved by AP1 switching to the AP3 service set identifier (SSID), which is stored as a backup. In an aspect, a power level can also be coordinated. For example, an AP2 power level can be increased to overcome interference. As another example, a signal modulation can be modified to improve a signal noise ratio between the AP1 and the AP2. Multiple-input and multiple-output (MIMO) technology can also be used to create and/or generate a multiple path transmission.

In an aspect, a non-interfering channel can be selected. For example, when a microwave is in operation, signals of other interference sources can be transmitted in a frequency band that is different from a microwave oven transmission frequency band. As another example, a WiFi channel can be selected to minimize undesired WiFi interferences. In another aspect, time phasing transmissions can be used to coordinate signal transmissions in the same frequency band. For example, signals can be transmitted and/or received when interference is not present. As such, timing of one or more interference sources can be determined to avoid signal transmission at an identified time. In another aspect, directional receivers can be used to reduce a device's sensitivity in the direction of an interfering transmitter thereby limiting the interference from the transmitter. Reducing sensitivity can be accomplished, for example, by MIMO receivers. In an aspect, an extent of an interference signal can be determined and the extent can be subtracted from a received signal to produce a real signal that is desired.

In an aspect, a power output can be coordinated for each of a plurality of independent networks through provisioning channel or a control channel. For example, a maximum transmit power of controllable transmitters can be backed off by a predefined amount. The back off can be modified if interference is detected. The back off can avoid multiple networks to increase power to overcome interference. The provisioning channel or the control channel can be implemented when a management entity (e.g., an Internet service provider) interconnects neighboring transmitters (e.g., access points) in homes. In an aspect, devices can be coordinated that do not share a service provider if the devices are connected to a control entity (e.g., a provisioning channel or a control channel) through Internet or other communications paths.

As another example, one or more interference sources can be an uncontrollable interference source (e.g., the interference source 102d in FIG. 1), such as atmosphere condition, temperature, humidity, the computing device 104 can determine an interference optimization method. For example, the interference optimization method can comprise changing at least one characteristic such as a position, an operation frequency, an operation channel, a modulation technique, an error correction technique, a power level, an operation time, and the like of a plurality of controllable interference sources (e.g., 102a, 102b, and 102c) in the system 100.

Figure 7:
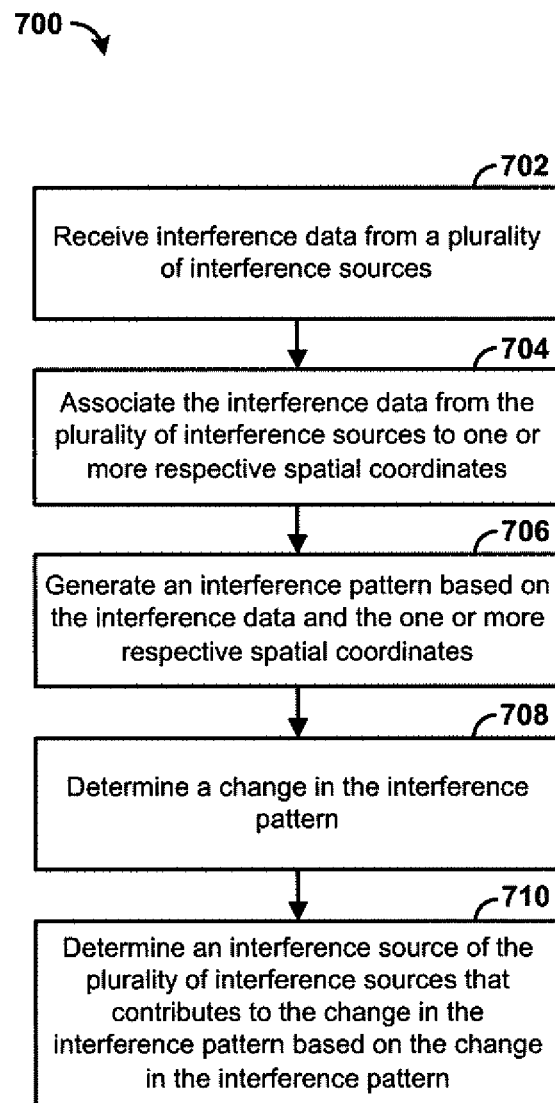
FIG. 7 is a flowchart illustrating another example method.

FIG. 7 is a flowchart illustrating another example method 700. At step 702, interference data from a plurality of interference sources in a system (e.g., the system 100) can be received. In an aspect, a computing device (e.g., the computing device 104) can receive the interference data from a plurality of interference sources (e.g., 102a, 102b, and 102c) and/or sensors that monitor (e.g., measure, quantify) interference sources (e.g., 102d). As an example, the plurality of interference sources can comprise microwave ovens, printers, computers, tablets, telephones, cordless phones, network nodes, network devices, set top boxes, televisions, radios, communication terminals, power lines, transmitters, atmosphere, and/or the like. As an example, the interference data can comprise weather data (e.g., a temperature, an air pressure, a wind speed, and a moisture level), position data, signal strength data, modulation technique data, power level data, network protocol data, network channel data, network address data, and/or the like. In an aspect, the computing device 104 can receive interference data from the plurality of interference sources via wireless links (e.g., a radio frequency, a satellite) and/or physical links (e.g., a fiber optic cable, a coaxial cable, an Ethernet cable, or a combination thereof). The interference data received can be stored at a database (e.g., the database 124) of the computing device 104. Sensors that can measure interference of an interference source, such as weather, can include a thermometer, a barometer, an anemometer, a hydrometer, a rain gauge, and the like.

In another aspect, a mobile user device, such as a smartphone or a tablet, can monitor (e.g., receive, determine, calculate, measure, and the like) interference from a plurality of interference sources (e.g., 102a, 102b, 102d, and 102d) to create and/or generate interference data. For example, a user can move through a predefined area while holding the mobile user device. The interference data created and/or generated by the mobile user device can be transmitted to the computing device 104 for further processing.

At step 704, the interference data received can be associated with one or more respective spatial coordinates from the plurality of interference sources within a defined space (e.g., house, building, office, business, park, and the like). In an aspect, the interference data can comprise a signal strength of specific frequency spectrums. The signal strength can be associated with one or more interference sources. In another aspect, the interference data can comprise position information (e.g., spatial coordinates). As such, interference data such as signal strength can be associated with spatial coordinates. In an aspect, multiple interference sources can be simultaneously present. In this scenario, correlations between one or more interference sources can be used to determine a combination of interference sources.

At step 706, an interference pattern can be created and/or generated based on the interference data received and the one or more respective spatial coordinates of the plurality of interference sources. As an example, the interference pattern can comprise one or more of: a radio interference pattern, a microwave interference pattern, an infrared interference pattern, a visible light interference pattern, an ultraviolet interference pattern, an X-ray interference pattern, a combination thereof and the like. In an aspect, the interference pattern can comprise a frequency spectrum associated with the plurality of interference sources. In another aspect, the interference pattern can comprise a spatial distribution of the plurality of sources associated with the frequency spectrum. As an example, the interference pattern can be a set of data and/or a plot of the set of data in the form of spatial coordinates of a specific location, an RSSI value (e.g., −74 dBm, −68 dBm) of the specific location, a respective frequency (e.g., 2.4 GHZ, 750 MHZ) and a respective protocol (e.g., 802.11, LTE) at the specific location (e.g., GPS coordinates). The interference pattern can be stored in a database (e.g., the database 124) of the computing device 104.

At step 708, a change in the interference pattern can be determined. In an aspect, a change in the interference pattern can be determined when a signal strength change at a certain frequency and/or a change in frequency magnitude are detected. For example, the signal strength change can indicate an interference source (e.g., a user device) changes from an inoperative state to an operative state, or vice versa. In another aspect, a change in the interference pattern can be determined when a change in the spatial distribution of the plurality of interference source is detected. For example, the change in the spatial distribution can indicate that an interference source (e.g., a user device) moves from one location to another location.

At step 710, an interference source of the plurality of interference sources that contributes to the change in the interference pattern can be determined. In an aspect, a type of the interference source can be determined based on the interference pattern and the change in the interference pattern. For example, a change in spatial distribution can indicate an interference source (e.g., a user device) moved from one location to another location. Thus, the computing device 104 can infer the type of interference source. For example, if the interference pattern indicates a change in location of an interference source, then the type of interference source can be a mobile device. In an aspect, analyzing the interference pattern over time can also indicate a repetitive nature of interference sources, which can further be used to determine the type of interference. For example, an interference change detected daily at a consistent time and that generates a consistent interference pattern could indicate a daily flight of an airplane. In another example, a microwave oven operates at 2450 MHz and thereby can cause interference at this frequency. When a signal strength increase is detected at 2450 MHz, the computing device 104 can determine a microwave oven is in operation, for example, via a search of a database (e.g., the database 124). In another aspect, the computing device 104 can determine the interference source that contributes to the change in the interference pattern is an unknown source, via searching a database (e.g., the database 124), for example. In an aspect, when the interference source that contributes to the change in the interference pattern is unknown to the system, the computing device 104 can receive necessary device information associated with the unknown source of interference, and update the database (e.g., the database 124) accordingly. The computing device 104 can determine whether or not an interference source is known and unknown by comparing a new interference pattern to interference patterns associated with interference signatures stored in the database 124. If the new interference pattern matches an interference pattern of an interference signature, then the new interference pattern is likely caused by the interference source associated with the interference signature.

When the interference source that contributes to the change in the interference pattern is determined, the computing device 104 can further determine device information associated with the interference source. The device information can be determined from the interference source or retrieved from the interference signature stored in the database 124. For example, a network address of the interference source can be determined. As another example, a user associated with the interference source can be determined. As another example, a location associated with the interference source can be determined. In an aspect, signature information (e.g., an interference pattern, an operation frequency, a signal strength level, a power level, and/or the like) of each interference source can be associated with the interference signature and stored in the database (e.g., the database 124). In an aspect, the signature information can be used to confirm that a specific user is present. For example, the computing device 104 can determine that the specific user (e.g., a dad, a mom) is watching TV in a living room based on the signature information of the smart phone associated with the specific user because the interference pattern indicates that the specific user is within 3 feet of a set top box in the living room. Once a user device is associated with a particular user, services can be correlated among specific user devices and pathway so each device can be optimized. For example, a user device can be associated with an AP as a SSID. Therefore, depending on signal strengths of APs, an AP with highest signal strength can be selected as a SSID to achieve better services.

In an aspect, when the interference source that contributes to the determined change in the interference pattern is unknown to the system, the computing device 104 can receive necessary interference source information associated with the unknown interference source, and update the database (e.g., the database 124) accordingly. For example, the computing device 104 can determine from a new interference pattern a type of interference source of the new interference source. For example, the computing system can determine from similar existing interference patterns of interference signatures that the new interference source is likely a mobile phone. The computing device 104 can try to obtain information from the new interference source through a variety of mobile communication techniques. In an aspect, an authorized user (e.g., a system administrator) can be prompted to acknowledge and/or register the new interference source added to the system 100. In an aspect, the computing device 104 can determine the interference source is an unauthorized interference source. In an aspect, the computing device 104 can signal a security system of a presence of the interference source when the interference source is an unauthorized interference source. The security system can alert the authorities to an intruder in the system.

In an aspect, a change in at least one characteristic of at least one interference source can be determined based on the change in the interference pattern. As an example, the at least one characteristic can comprise one or more of a position, a frequency, a modulation technique, an error correction technique, a power level, a network protocol, a network channel, an operation time, and the like.

In an aspect, the change in at least one characteristic can be a change in operation time. In this scenario, a beacon or a trigger can be established among the plurality of interference sources 102a, 102b, and 102c such as a telephone, a printer, a microwave, a computer, and/or the like. For example, the computing device 104 can establish a round robin schedule to enable each interference source 102a, 102b, and 102c to take turns using a spectrum. In another aspect, the change in at least one characteristic can be a change in a power level. For example, the interference source 102a, 102b, and 102c can coordinate the power level with each other via the computing device 104 to reach a performance level that is optimal.

In an aspect, a determined interference source and/or an associated characteristic can be uncontrollable (e.g., 102d). Examples of uncontrollable interference sources can comprise weather conditions, celestial objects, and/or other natural phenomena. When the determined interference source is an uncontrollable interference source, then the computing device 104 can change characteristics such as positions, operation frequencies, operation channels, modulation techniques, error correction techniques, power levels, and the like of a controllable interference source (e.g., 102a, 102b, and 102c) in the system 100.

Figure 8:
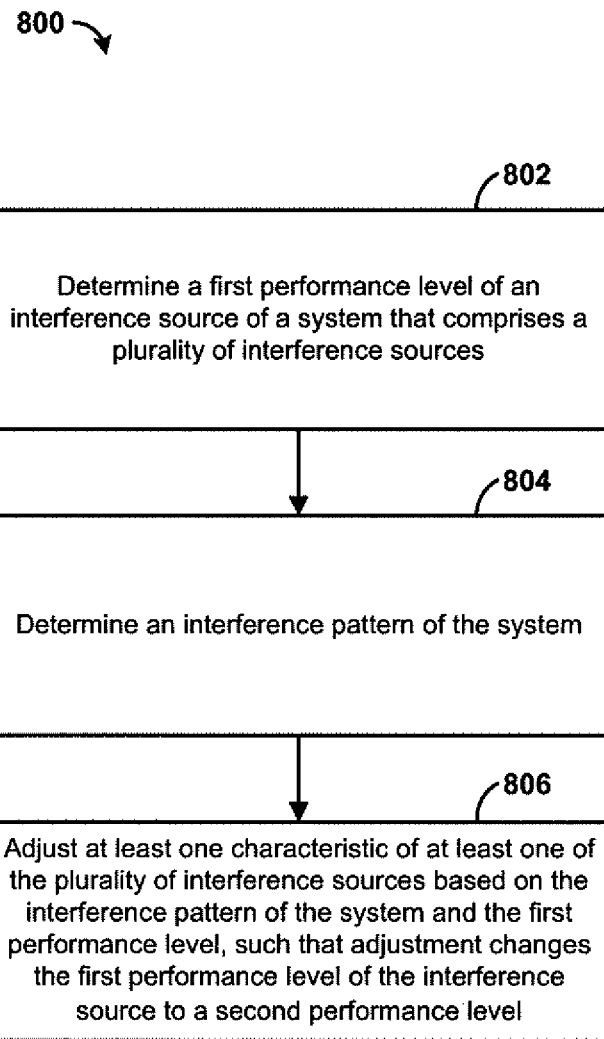
FIG. 8 is a flowchart illustrating another example method.

FIG. 8 is a flow chart illustrating another example method 800. In step 802, a first performance level of an interference source can be determined. The interference source can be a part of a system (e.g., system 100) comprising a plurality of interference sources. In an aspect, the first performance level can be when a threshold performance level of a performance parameter of a device (e.g., an interference source, an electronic device) in the system 100 is exceeded. As an example, one or more performance parameters, such as a number of errors occurring in the device, a speed of the device, and/or the like, can be at a threshold level that is not acceptable for the device. The interference source can signal a computing device (e.g., computing device 104) that the interference source is at the first performance level, which does not comply with the threshold performance level. In an aspect, the computing device 104 can monitor a performance level of each of the plurality of interference sources. The computing device 104 can determine when the first performance level is present at which a threshold performance level of a performance parameter is exceeded. In an aspect, the first performance level can be a performance level where the interference source is not performing at an optimal level. In an aspect, the first performance level can be a performance level that is optimal and/or is at a performance level that does comply with the threshold performance level. However, the interference source can be an interference source and/or device that the computing device 104 determines is not an interference source that should be operating in the system 100 and therefore the computing device 104 can determine other interference sources which can be adjusted to interfere with the performance level of the interference source. For example, the interference source could be an unauthorized device to the system that is malicious to the system. The computing device can detect the unauthorized device and cause other interference sources to produce interference that will limit the performance of the unauthorized device. In an aspect, the computing device 104 can signal a security system of a presence of the interference source when the interference source is an unauthorized interference source.

In step 804, an interference pattern of the system can be determined. As an example, the interference pattern can comprise one or more of: a radio interference pattern, a microwave interference pattern, an infrared interference pattern, a visible light interference pattern, an ultraviolet interference pattern, an X-ray interference pattern, a combination thereof, and the like. In an aspect, the interference pattern can comprise a frequency spectrum associated with the plurality of interference sources. In another aspect, the interference pattern can comprise a spatial distribution of the plurality of sources associated with the frequency spectrum. As an example, the interference pattern can be a set of data and/or a plot of the set of data in the form of spatial coordinates of a specific location, an RSSI value (e.g., −74 dBm, −68 dBm) of the specific location, a respective frequency (e.g., 2.4 GHZ, 750 MHZ) and a respective protocol (e.g., 802.11, LTE) at the specific location (e.g., GPS coordinates). The interference pattern can be stored in a database (e.g., the database 124) of the computing device 104.

In step 806, at least one characteristic of at least one of the plurality of interference sources can be adjusted. The at least one characteristic can be adjusted based on the interference pattern of the system and the first performance level. The adjustment of the at least one characteristic can change the first performance level of the interference source to a second performance level. In an aspect, the second performance level can be a performance level where the interference sources can perform at an optimal performance level. In an aspect, the second performance level can be a performance level where the interference source is complying with a threshold performance level. In an aspect, the second performance level can be a performance level that is not optimal and/or is at performance level that does not comply with the threshold performance level. This result can occur when the interference source is an interference source and/or device that the computing device 104 does not want to be operating on the system (e.g., unauthorized interference source) and therefore the computing device 104 may adjust at least one characteristic of other interference sources to interfere with the performance level of the interference source.

In an aspect, the at least one characteristic can comprise one or more of a position, a frequency, a modulation technique, an error correction technique, a power level, a network protocol, a network channel, an operation time, and the like. As an example of a change in at least one characteristic, network channels can be reassigned for a plurality of access points within close proximity in a predefined area according to the determined interference source and associated characteristic. As another example characteristic change, a beacon or a trigger can be established in the plurality of interference sources (e.g., 102a, 102b, and 102c). The computing device 104 can establish a round robin schedule to enable each interference source 102a, 102b, and 102c to take turns using a spectrum. As another example, the interference source 102a, 102b, and 102c can coordinate power levels with each other via the computing device 104 to minimize interference in the system 100.

As another example of a characteristic change, a first access point (AP1) can be configured to receive signals from a second access point (AP2) and a third access point (AP3). AP2 can be configured to transmit signals from the AP3 to the AP1. When interference reduces a signal transmission rate of the AP2, the AP3 can be configured to transmit signals directly to the AP1. The characteristic change whereby signals are sent to the AP1 from the AP3 can be achieved by AP1 switching to the AP3 service set identifier (SSID), which is stored as a backup. In an aspect, a power level can also be coordinated. For example, an AP2 power level can be increased to overcome interference. As another example, a signal modulation can be modified to improve a signal noise ratio between the AP1 and the AP2. Multiple-input and multiple-output (MIMO) technology can also be used to create and/or generate a multiple path transmission.

In an aspect, a non-interfering channel can be selected. For example, when a microwave is in operation, signals of other interference sources can be transmitted in a frequency band that is different from a microwave oven transmission frequency band. As another example, a WiFi channel can be selected to minimize undesired WiFi interferences. In another aspect, time phasing transmissions can be used to coordinate signal transmissions in the same frequency band. For example, signals can be transmitted and/or received when interference is not present. As such, timing of one or more interference sources can be determined to avoid signal transmission at an identified time. In another aspect, directional receivers can be used to reduce a device's sensitivity in the direction of an interfering transmitter thereby limiting the interference from the transmitter. Reducing sensitivity can be accomplished, for example, by MIMO receivers. In an aspect, an extent of an interference signal can be determined and the extent can be subtracted from a received signal to produce a real signal that is desired.

In an aspect, power output can be coordinated for each of a plurality of independent networks through provisioning channel or a control channel. For example, a maximum transmit power of controllable transmitters can be backed off by a predefined amount. The back off can be modified if interference is detected. The back off can avoid multiple networks to increase power to overcome interference. The provisioning channel or control channel can be implemented when a management entity (e.g., an internet service provider) interconnects neighboring transmitters (e.g., access points) in homes. In an aspect, devices can be coordinated that do not share a service provider if the devices are connected to a control entity (e.g., a provisioning channel or a control channel) through Internet or other communications paths.

In an aspect, a determined interference source and/or an associated characteristic can be uncontrollable (e.g., 102d). Examples of uncontrollable interference sources can comprise weather conditions, celestial objects, and/or other natural phenomena. When the determined interference source is an uncontrollable interference source, then the computing device 104 can change characteristics such as positions, operation frequencies, operation channels, modulation techniques, error correction techniques, power levels, and the like of a controllable interference source (e.g., 102a, 102b, and 102c).

Figure 9:
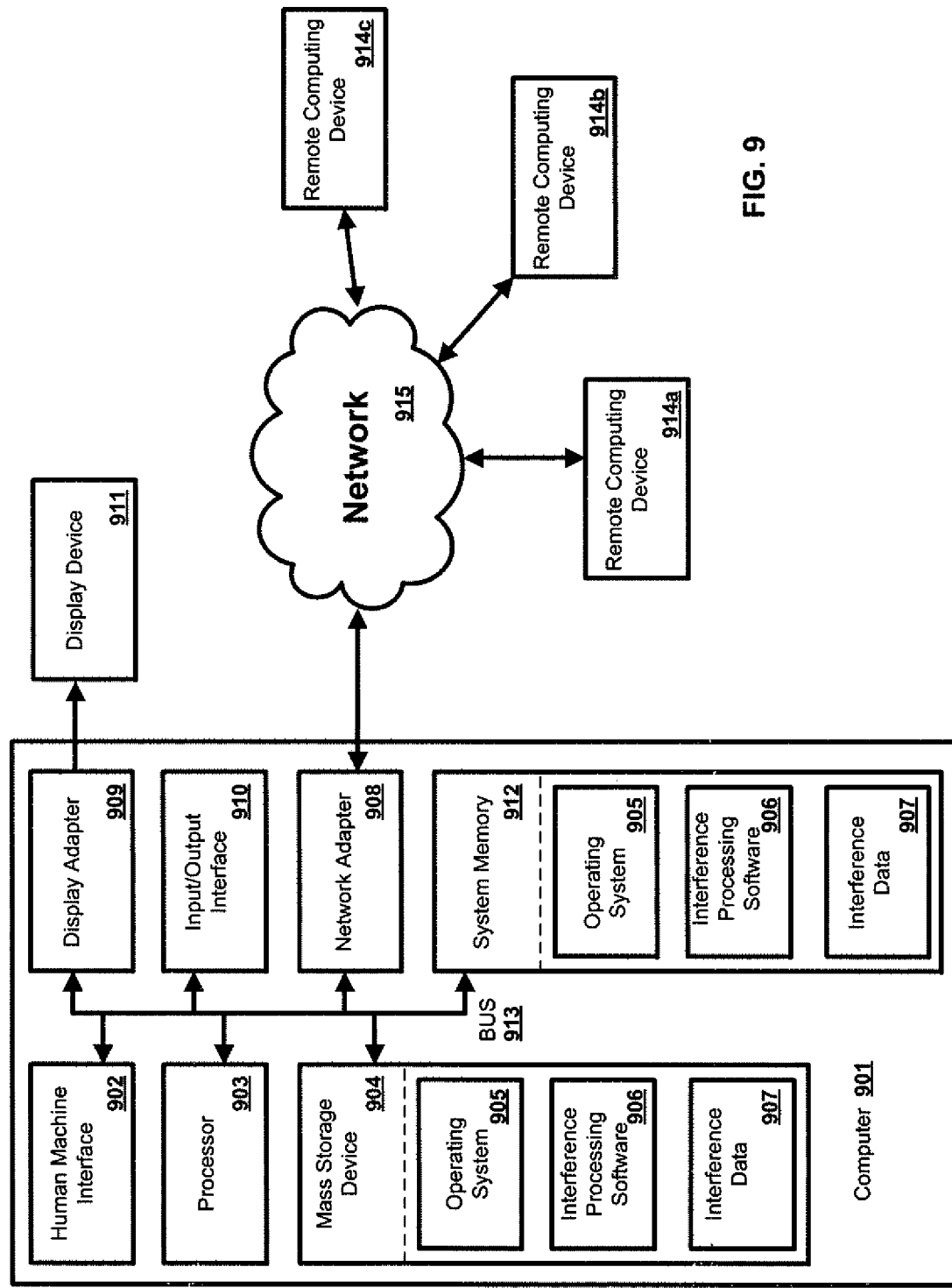
FIG. 9 is a block diagram illustrating an example computing device.

FIG. 9 is a block diagram illustrating an example computing device. In an exemplary aspect, the methods and systems can be implemented on a computer 901 as illustrated in FIG. 9 and described below. By way of example, user device 102, computing device 104 of FIG. 1 can be a computer 901 as illustrated in FIG. 9. Similarly, the methods and systems disclosed can utilize one or more computers to perform one or more functions in one or more locations. FIG. 9 is a block diagram illustrating an exemplary operating environment 900 for performing the disclosed methods. This exemplary operating environment 900 is only an example of an operating environment and is not intended to suggest any limitation as to the scope of use or functionality of operating environment architecture. Neither should the operating environment 900 be interpreted as having any dependency or requirement relating to any one or combination of components illustrated in the exemplary operating environment 900.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, and/or the like that perform particular tasks or implement particular abstract data types. The disclosed methods can also be practiced in grid-based and distributed computing environments where tasks are performed by remote processing devices that are linked through a communications network. In a distributed computing environment, program modules can be located in local and/or remote computer storage media including memory storage devices.

Further, one skilled in the art will appreciate that the systems and methods disclosed herein can be implemented via a general-purpose computing device in the form of a computer 901. The computer 901 can comprise one or more components, such as one or more processors 903, a system memory 912, and a bus 913 that couples various components of the computer 901 including the one or more processors 903 to the system memory 912. In the case of multiple processors 903, the system can utilize parallel computing.

The bus 913 can comprise one or more of several possible types of bus structures, such as a memory bus, memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description can also be implemented over a wired or wireless network connection and one or more of the components of the computer 901, such as the one or more processors 903, a mass storage device 904, an operating system 905, interference processing software 906, interference data 907, a network adapter 908, system memory 912, an Input/Output Interface 910, a display adapter 909, a display device 911, and a human machine interface 902, can be contained within one or more remote computing devices 914a,b,c at physically separate locations, connected through buses of this form, in effect implementing a fully distributed system.

The computer 901 typically comprises a variety of computer readable media. Exemplary readable media can be any available media that is accessible by the computer 901 and comprises, for example and not meant to be limiting, both volatile and non-volatile media, removable and non-removable media. The system memory 912 can comprise computer readable media in the form of volatile memory, such as random access memory (RAM), and/or non-volatile memory, such as read only memory (ROM). The system memory 912 typically can comprise data such as interference data 907 and/or program modules such as operating system 905 and interference processing software 906 that are accessible to and/or are operated on by the one or more processors 903.

In another aspect, the computer 901 can also comprise other removable/non-removable, volatile/non-volatile computer storage media. By way of example, the computer 901 can comprise a mass storage device 904 which can offer non-volatile storage of computer code, computer readable instructions, data structures, program modules, and other data for the computer 901. For example, a mass storage device 904 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 904, including by way of example, an operating system 905 and interference processing software 906. One or more of the operating system 905 and interference processing software 906 (or some combination thereof) can comprise elements of the programming and the interference processing software 906. Interference data 907 can also be stored on the mass storage device 904. Interference data 907 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple locations within the network 915.

In another aspect, the user can enter commands and information into the computer 901 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like. These and other input devices can be connected to the one or more processors 903 via a human machine interface 902 that is coupled to the bus 913, but can be connected by other interface and bus structures, such as a parallel port, game port, an IEEE 1394 Port (also known as a Firewire port), a serial port, network adapter 908, and/or a universal serial bus (USB).

In yet another aspect, a display device 911 can also be connected to the bus 913 via an interface, such as a display adapter 909. It is contemplated that the computer 901 can have more than one display adapter 909 and the computer 901 can have more than one display device 911. For example, a display device 911 can be a monitor, an LCD (Liquid Crystal Display), light emitting diode (LED) display, television, smart lens, smart glass, and/or a projector. In addition to the display device 911, other output peripheral devices can comprise components such as speakers (not shown) and a printer (not shown) which can be connected to the computer 901 via Input/Output Interface 910. Any step and/or result of the methods can be output in any form to an output device. Such output can be any form of visual representation, including, but not limited to, textual, graphical, animation, audio, tactile, and the like. The display 911 and computer 901 can be part of one device, or separate devices.

The computer 901 can operate in a networked environment using logical connections to one or more remote computing devices 914a, 914b, and 914c. By way of example, a remote computing device 914a, 914b, and 914c can be a personal computer, a computing station (e.g., a workstation), a portable computer (e.g., a laptop, a mobile phone, a tablet device), a smart device (e.g., a smartphone, a smart watch, an activity tracker, a smart apparel, a smart accessory), a security and/or monitoring device, a server, a router, a network computer, a peer device, an edge device or other common network node, and so on. Logical connections between the computer 901 and a remote computing device 914a, 914b, and 914c can be made via a network 915, such as a local area network (LAN) and/or a general wide area network (WAN). Such network connections can be through a network adapter 908. A network adapter 908 can be implemented in both wired and wireless environments. Such networking environments are conventional and commonplace in dwellings, offices, enterprise-wide computer networks, intranets, and the Internet.

For purposes of illustration, application programs and other executable program components such as the operating system 905 are illustrated herein as discrete blocks, although it is recognized that such programs and components can reside at various times in different storage components of the computer 901, and are executed by the one or more processors 903 of the computer 901. An implementation of interference processing software 906 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" can comprise volatile and non-volatile, removable and non-removable media implemented in any methods or technology for storage of information such as computer readable instructions, data structures, program modules, or other data. Exemplary computer storage media can comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques such as machine learning and iterative learning. Examples of such techniques include, but are not limited to, expert systems, case based reasoning, Bayesian networks, behavior based AI, neural networks, fuzzy systems, evolutionary computation (e.g., a genetic algorithms), swarm intelligence (e.g., an ant algorithms), and hybrid intelligent systems (e.g., expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by at least one computing device, interference data from a plurality of interference sources;
   determining, based on the interference data, an interference pattern associated with an interference source of the plurality of interference sources;
   determining a type of interference associated with the interference source; and
   causing, based on the type of interference, adjustment of at least one characteristic of a signal, generated by the interference source, to mitigate interference associated with the plurality of interference sources.

2. The method of claim 1, wherein the interference data comprises at least one of: weather data or position data.

3. The method of claim 1, wherein determining the interference pattern comprises determining, based on at least one respective spatial coordinates associated with the plurality of interference sources, the interference pattern.

4. The method of claim 1, wherein the interference pattern comprises at least one of: a radio interference pattern, a microwave interference pattern, an infrared interference pattern, or a visible light interference pattern.

5. The method of claim 1, wherein the interference pattern comprises a spatial distribution of the interference associated with the plurality of interference sources.

6. The method of claim 1, wherein causing the adjustment of the at least one characteristic comprises causing at least one of: a change to a position, a change to a frequency, a change to a network channel, a change to a power level, a change to a beacon, a change to a trigger, a change to a schedule, or a change to a performance level of the interference source.

7. The method of claim 1, wherein the at least one characteristic comprises at least one of: a position, a frequency, a network channel, a power level, a performance level, a modulation technique, or a signal transmission rate.

8. The method of claim 1, further comprising determining, based on a comparison of the interference data to stored interference data, whether the interference source is a known interference source or an unknown interference source.

9. The method of claim 1, further comprising determining a user account associated with the interference source.

10. The method of claim 1, further comprising determining a location associated with the interference source.

11. The method of claim 1, further comprising:
    determining that the interference source is an unauthorized interference source; and
    signaling, to a security system, an indication of a presence of the unauthorized interference source.

12. A method comprising:
receiving, by at least one computing device, interference data from a plurality of interference sources;
associating the interference data from the plurality of interference sources to at least one respective spatial coordinates;
determining, based on the interference data and the at least one respective spatial coordinates, an interference pattern associated with an interference source of the plurality of interference sources; and
causing, based on the interference pattern, adjustment of at least one characteristic of a signal, generated by the interference source, to mitigate interference associated with the plurality of interference sources.

13. The method of claim 12, wherein the interference data comprises at least one of: signal strength data or modulation technique data.

14. The method of claim 12, wherein the interference pattern comprises at least one of: a radio interference pattern, a microwave interference pattern, an infrared interference pattern, or a visible light interference pattern.

15. The method of claim 12, wherein causing the adjustment of the at least one characteristic comprises causing at least one of: a change to a position, a change to a frequency, a change to a network channel, a change to a power level, a change to a beacon, a change to a trigger, a change to a schedule, or a change to a performance level of the interference source.

16. The method of claim 12, wherein the at least one characteristic comprises a power level configured to be coordinated with another power level of another interference source of the plurality of interference sources.

17. The method of claim 12, wherein the at least one characteristic comprises at least one of: a position, a frequency, a network channel, a power level, a performance level, a modulation technique, or a signal transmission rate.

18. The method of claim 12, further comprising:
determining that the interference source is an unauthorized interference source; and
signaling, to a security system, an indication of a presence of the unauthorized interference source.

19. The method of claim 12, further comprising determining, based on a comparison of the interference data to stored interference data, whether the interference source is a known interference source or an unknown interference source.

20. The method of claim 12, further comprising determining a user account associated with the interference source.

21. The method of claim 12, wherein associating the interference data from the plurality of interference sources to the at least one respective spatial coordinates comprises associating signal strength to at least one location identified by the at least one respective spatial coordinates.

22. A method, comprising:
determining, by at least one computing device, a performance level measurement of a first interference source of a system comprising a plurality of interference sources;
determining an interference pattern of the system; and
causing, based on the interference pattern of the system and the performance level measurement, adjustment of at least one characteristic of the first interference source.

23. The method of claim 22, wherein determining the performance level measurement of the first interference source comprises determining a result of a comparison between a performance parameter of the first interference source and a threshold performance level, wherein the performance parameter comprises at least one of: a speed of the first interference source or a quantity of errors associated with the first interference source.

24. The method of claim 22, further comprising determining that a second interference source of the plurality of interference sources is an unauthorized interference source, wherein causing the adjustment comprises causing interference that reduces a performance level of the unauthorized interference source.

25. The method of claim 24, wherein an interference signature indicates that the unauthorized interference source is an intruder to the system.

26. The method of claim 22, wherein the at least one characteristic comprises at least one of a position, a frequency, a network channel, a power level, a modulation technique, or a signal transmission rate.

27. The method of claim 22, wherein causing the adjustment of the at least one characteristic comprises causing at least one of: a change to a position, a change to a frequency, a change to a network channel, a change to a power level, a change to a beacon, a change to a trigger, a change to a schedule, or a change to a performance level of the first interference source.

* * * * *